(12) United States Patent
Gao et al.

(10) Patent No.: US 12,394,060 B2
(45) Date of Patent: Aug. 19, 2025

(54) IMAGE DATA PROCESSING METHOD AND APPARATUS

(71) Applicant: Tencent Cloud Computing (Beijing) Co., Ltd., Beijing (CN)

(72) Inventors: Binbin Gao, Beijing (CN); Feng Luo, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 356 days.

(21) Appl. No.: 18/127,223

(22) Filed: Mar. 28, 2023

(65) Prior Publication Data
US 2023/0237666 A1 Jul. 27, 2023

Related U.S. Application Data

(63) Continuation of application No. PCT/CN2021/109293, filed on Jul. 29, 2021.

(30) Foreign Application Priority Data

Jun. 10, 2021 (CN) .......................... 2021106486954

(51) Int. Cl.
*G06T 7/12* (2017.01)
*G06V 10/44* (2022.01)
(Continued)

(52) U.S. Cl.
CPC ................ *G06T 7/12* (2017.01); *G06V 10/44* (2022.01); *G06V 10/764* (2022.01); *G06V 10/806* (2022.01); *G06V 10/82* (2022.01)

(58) Field of Classification Search
CPC ........ G06T 7/12; G06V 10/44; G06V 10/764; G06V 10/806; G06V 10/82; G06V 10/26; G06V 10/454; G06F 18/25; G06F 18/24
See application file for complete search history.

(56) References Cited

U.S. PATENT DOCUMENTS

2011/0123090 A1 5/2011 Zerfass et al.

FOREIGN PATENT DOCUMENTS

| CN | 109409371 | 3/2019 |
| CN | 112052839 | 12/2020 |

(Continued)

OTHER PUBLICATIONS

Zhou, Yan ("3D shape classification and retrieval based on polar view") Information Sciences 474. (Year: 2019).*

(Continued)

*Primary Examiner* — Molly Wilburn
(74) *Attorney, Agent, or Firm* — Crowell & Moring LLP

(57) ABSTRACT

An image data processing method and apparatus are provided. In a technical solution provided by embodiments of this disclosure, M object feature maps with different sizes are obtained by extracting a source image. While classification confidence levels corresponding to pixel points in each of the object feature maps are acquired, initial predicted polar radii corresponding to the pixel points in each of the object feature maps may also be acquired. The initial predicted polar radii are refined based on polar radius deviations corresponding to the contour sampling points in each of the object feature maps, to acquire target predicted polar radii corresponding to the pixel points in each of the object feature maps. Then the object edge shape of a target object contained in the source image can be determined based on the target predicted polar radii and the classification confidence levels.

20 Claims, 12 Drawing Sheets

(51) Int. Cl.
  *G06V 10/764*    (2022.01)
  *G06V 10/80*     (2022.01)
  *G06V 10/82*     (2022.01)

(56) References Cited

FOREIGN PATENT DOCUMENTS

| | | |
|---|---|---|
| CN | 112330701 | 2/2021 |
| CN | 112381062 | 2/2021 |
| CN | 112446356 | 3/2021 |

OTHER PUBLICATIONS

Zhou, Lin, Wei, Hoaran (" Arbitrary-Oriented Object Detection in Remote Sensing Images Based on Polar Coordinates") IEEE Access (Year: 2020).*
International Search Report issued Mar. 1, 2022 in International (PCT) Application No. PCT/CN2021/109293.
Zhang, Xuyi et al., "Contour-Point Refined Mask Prediction for Single-Stage Instance Segmentation", (Acta Optica Sinica), vol. 40, No. 21, Nov. 30, 2020.

* cited by examiner

IMAGE DATA PROCESSING METHOD AND APPARATUS

RELATED APPLICATION

This application is a continuation application of PCT Patent Application No. PCT/CN2021/109293, filed on Jul. 29, 2021, which claims priority to Chinese Patent Application No. 2021106486954, entitled "IMAGE DATA PROCESSING METHOD AND APPARATUS, DEVICE AND MEDIUM" filed on Jun. 10, 2021, wherein the content of the above-referenced applications is incorporated herein by reference in its entirety.

FIELD OF THE TECHNOLOGY

This disclosure relates to the field of artificial intelligence technologies, and in particular to an image data processing method and apparatus, a device and a medium.

BACKGROUND OF THE DISCLOSURE

Instance segmentation refers to that given an image or video frame, all instances contained in the image or video frame are found out, and are recognized and segmented. As the basis of computer vision tasks such as video understanding and automatic driving, the instance segmentation has become a hot issue in the field of computer vision.

SUMMARY

Embodiments of this disclosure provide an image data processing method and apparatus, a device and a medium, which can improve the accuracy of image segmentation.

In one aspect, the embodiments of this disclosure provide an image data processing method, including:

Acquiring M object feature maps of a source image, the M object feature maps being associated with target objects contained in the source image, the M object feature maps being image features with different sizes, and M being a positive integer;

Acquiring initial predicted polar radii corresponding to pixel points in each of the object feature maps in the source image, and acquiring, from each of the object feature maps, contour sampling points corresponding to the target object based on the initial predicted polar radii;

Acquiring polar radius deviations corresponding to the contour sampling points in each of the object feature maps;

Determining target predicted polar radii corresponding to the pixel points in each of the object feature maps in the source image, the target predicted polar radius being a sum of the polar radius deviation and the initial predicted polar radius;

Determining, from the source image, a candidate edge shape associated with each of the object feature maps based on the target predicted polar radii corresponding to the pixel points in each of the object feature maps; and Determining, from the candidate edge shape associated with each of the object feature maps, an object edge shape used for representing the contour of the target object based on classification confidence levels corresponding to the pixel points in each of the object feature maps, the classification confidence levels representing the degree of association between the pixel points in each of the object feature maps and the target object.

In one aspect, the embodiments of this disclosure provide an image data processing method, including:

Acquiring a sample image containing sample objects, input the sample image into an initial image segmentation model, and outputting M sample feature maps associated with the sample objects by a residual component and a feature fusion component in the initial image segmentation model, the sample image carrying label information corresponding to the sample object, the M sample feature images being image features with different sizes, and M being a positive integer;

Outputting sample classification confidence levels corresponding to pixel points in each of the object feature maps by a classification component in the initial image segmentation model, the sample classification confidence levels representing the degree of association between the pixel points in each of the object feature maps and the sample object;

Acquiring, in a regression component of the initial image segmentation model, initial sample polar radii corresponding to the pixel points in each of the object feature maps, and acquiring, from each of the object feature maps, sample contour sampling points corresponding to the sample object based on the initial sample polar radii, a contour comprised of the sample contour sampling points being associated with the contour of the sample object;

Acquiring sample polar radius deviations corresponding to the sample contour sampling points in each of the object feature maps, and determining the sum of the sample polar radius deviation and the initial sample polar radius as a target sample polar radius corresponding to the pixel point in each of the object feature maps; and Training, based on the sample classification confidence levels, the initial sample polar radii, the target sample polar radii and the label information, network parameters of the initial image segmentation model to obtain a target image segmentation model, the target image segmentation model being configured to locate and recognize the target object in the source image.

In one aspect, the embodiments of this disclosure provide an image data processing apparatus, including a memory operable to store computer-readable instructions and a processor circuitry operable to read the computer-readable instructions. When executing the computer-readable instructions, the processor circuitry is configured to:

acquire M object feature maps of a source image, the M object feature maps being associated with target objects contained in the source image, the M object feature maps being image features with different sizes, and M being a positive integer;

acquire initial predicted polar radii corresponding to pixel points in each of the object feature maps in the source image, and acquire, from each of the object feature maps, contour sampling points corresponding to the target object based on the initial predicted polar radii;

acquire polar radius deviations corresponding to the contour sampling points in each of the object feature maps;

determine target predicted polar radii corresponding to the pixel points in each of the object feature maps in the source image, the target predicted polar radius being a sum of the polar radius deviation and the initial predicted polar radius;

determine, from the source image, a candidate edge shape associated with each of the object feature maps based on the target predicted polar radii corresponding to the pixel points in each of the object feature maps; and determine, from the candidate edge shape associated with each of the object feature maps, an object edge shape representing a contour of the target object based on the classification confidence levels corresponding to the pixel points in each of the object feature maps, the classification confidence levels representing a degree of association between the pixel points in each of the object feature maps and the target object.

In one aspect, the embodiments of this disclosure provide a computer-readable storage medium with a computer program stored therein. The computer program is suitable for being loaded and executed by a processor, such that a computer device with the processor can execute the method provided in the above aspect of the embodiments of this disclosure.

According to one aspect of this disclosure, a computer program product or computer program is provided, the computer program product or computer program including a computer instruction, the computer instruction being stored in a computer-readable storage medium. The processor of the computer device reads the computer instruction from the computer-readable storage medium, and the processor executes the computer instruction, such that the computer device executes the method provided in the above aspect.

In a technical solution provided by the embodiments of this disclosure, the M object feature maps with different sizes are obtained by extracting the source image. While the classification confidence levels corresponding to the pixel points in each object feature map are acquired, the initial predicted polar radii corresponding to the pixel points in each object feature map may also be acquired. The initial predicted polar radii are refined based on the polar radius deviations corresponding to the contour sampling points in each object feature map to acquire the target predicted polar radii corresponding to the pixel points in each object feature map, which can improve the regression accuracy of the target predicted polar radii. Then the object edge shape of the target object contained in the source image can be determined based on the target predicted polar radii and the classification confidence levels, thereby improving the accuracy of image segmentation.

BRIEF DESCRIPTION OF THE DRAWINGS

To describe the technical solutions in the embodiments of this disclosure or in the related art more clearly, the following briefly introduces the accompanying drawings for describing the embodiments or the related art. Apparently, the accompanying drawings in the following description show merely some embodiments of this disclosure, and a person of ordinary skill in the art may still derive other drawings from the accompanying drawings without creative efforts.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without making creative efforts shall fall within the protection scope of this disclosure.

This disclosure specifically relates to image instance segmentation in image processing. After a source image containing target objects is acquired, feature extraction can be performed on the source image, feature maps with different sizes are acquired from the source image, and object feature maps at different levels can be obtained by performing information fusion on the feature maps with different sizes. Then subsequent processing can be performed on the object feature maps at different tiers. An object edge shape used for representing the contour of the target object can be determined from the source image, and an object classification result for the target object is obtained.

According to this disclosure, instance segmentation services in an AI theme mall can be accessed via an API. Instance segmentation is performed on the source image containing the target objects through the instance segmentation services, to determine the object edge shape and classification and recognition result corresponding to the target object in the source image.

Figure 1:
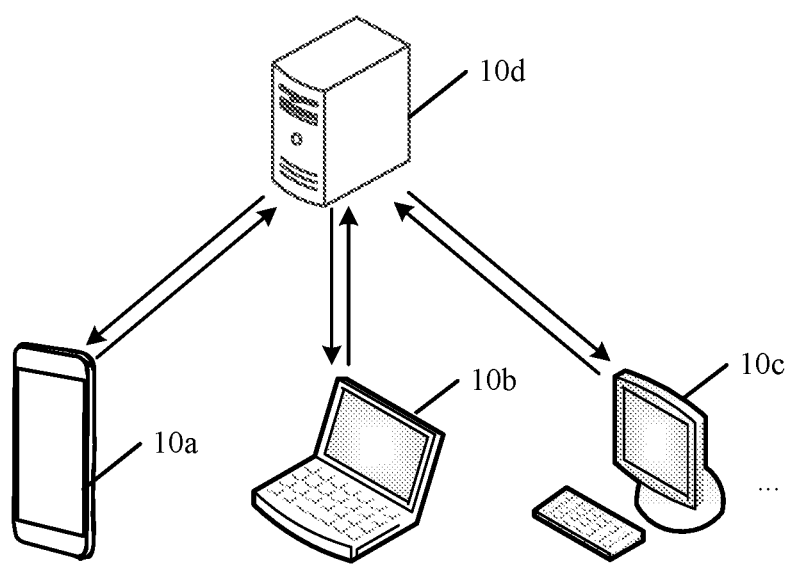
FIG. 1 is a structural schematic diagram of a network architecture according to an embodiment of this disclosure.

Refer to FIG. 1, FIG. 1 being a structural schematic diagram of a network architecture provided by an embodiment of this disclosure. As shown in FIG. 1, the network architecture may include a server 10d and a user terminal cluster. The user terminal cluster may include one or more user terminals. The number of the user terminals is not limited here. As shown in FIG. 1, the user terminal cluster may specifically include a user terminal 10a, a user terminal 10b, a user terminal 10c and the like. Where the server 10d may be an independent physical server, or a server cluster or distributed system comprised of multiple physical servers, or a cloud server that provides basic cloud computing services such as cloud services, cloud databases, cloud computing, cloud functions, cloud storage, network services, cloud communications, middleware services, domain name services, security services, CDN, and big data and artificial intelligence platforms. The user terminal 10*a*, the user terminal 10*b*, the user terminal 10*c* and the like each may include: smart terminals with an image instance segmentation function, such as a smart phone, a tablet, a laptop, a hand-held computer, a mobile internet devices (MID), a wearable device (such as a smart watch, a smart bracelet, etc.), and a smart television. As shown in FIG. 1, the user terminal 10*a*, the user terminal 10*b*, the user terminal 10*c* and the like may be connected with the server 10*d* via a network, so that each user terminal may perform data interaction with the server 10*d* through the connection via the network.

As shown in FIG. 1, taking the user terminal 10*a* in the user terminal cluster as an example, the user terminal 10*a* may acquire a source image (i.e., an image that requires image instance segmentation) containing target objects. Feature maps with different sizes are extracted from the aforementioned source image by performing feature extraction on the source image. Then the extracted feature maps can be fused, to obtain object feature maps (the object feature maps at different tiers may be image features with different sizes) at different tiers. Then the object feature maps at different tiers are classified to predict category confidence levels and center confidence levels corresponding to pixel points in each object feature map, where the category confidence levels are used for representing the probability that the pixel points in the object feature map belong to respective categories, and the center confidence level is used for representing the distance between the pixel point in the object feature map and the center point of an image region where the target object is located. At the same time, polar radius regression is further performed on the object feature maps at different tiers to predict target predicted polar radii corresponding to the pixel points in each object feature map. An object edge shape used for representing the contour of the target object can be generated in the source image based on the category confidence levels, the center confidence levels and the target predicted polar radii. Target pixel points covered by the object edge shape in the source image are acquired. Object classification results corresponding to the target objects in the source image can be determined based on the category confidence levels of the target pixel points.

In this disclosure, object contour modeling can be performed based on a polar coordinate system, and the target object is detected by predicting the distance between the center point of the target object contained in the source image and an object edge. In this disclosure, coordinates of the target object in the source image are set as polar coordinates, and the distance between the center point of the target object and the object edge is expressed as a length and an angle, for example, for a target object in the source image, 36 rays (the angular spacing between the 36 rays is the same, that is, it only requires to predict endpoints of the 36 rays during an image instance segmentation process, if polar angles corresponding to the 36 rays are known in the polar coordinate system, and the rays that determine the endpoints may be referred to as polar radii) are determined around the center. The object contour of the target object can be formed by connecting the predicted endpoints of the 36 rays, and then detection and segmentation of the target object contained in the source image are unified in a same framework. Where predicting the endpoints of the 36 rays may be understood as predicting the target predicted polar radii, the center of the target object contained in the source image can be predicted based on the center confidence levels, and an object edge shape (the real object contour of the target object) corresponding to the target object can be formed by connecting the endpoints of the target predicted polar radii corresponding to the center.

Figure 2:
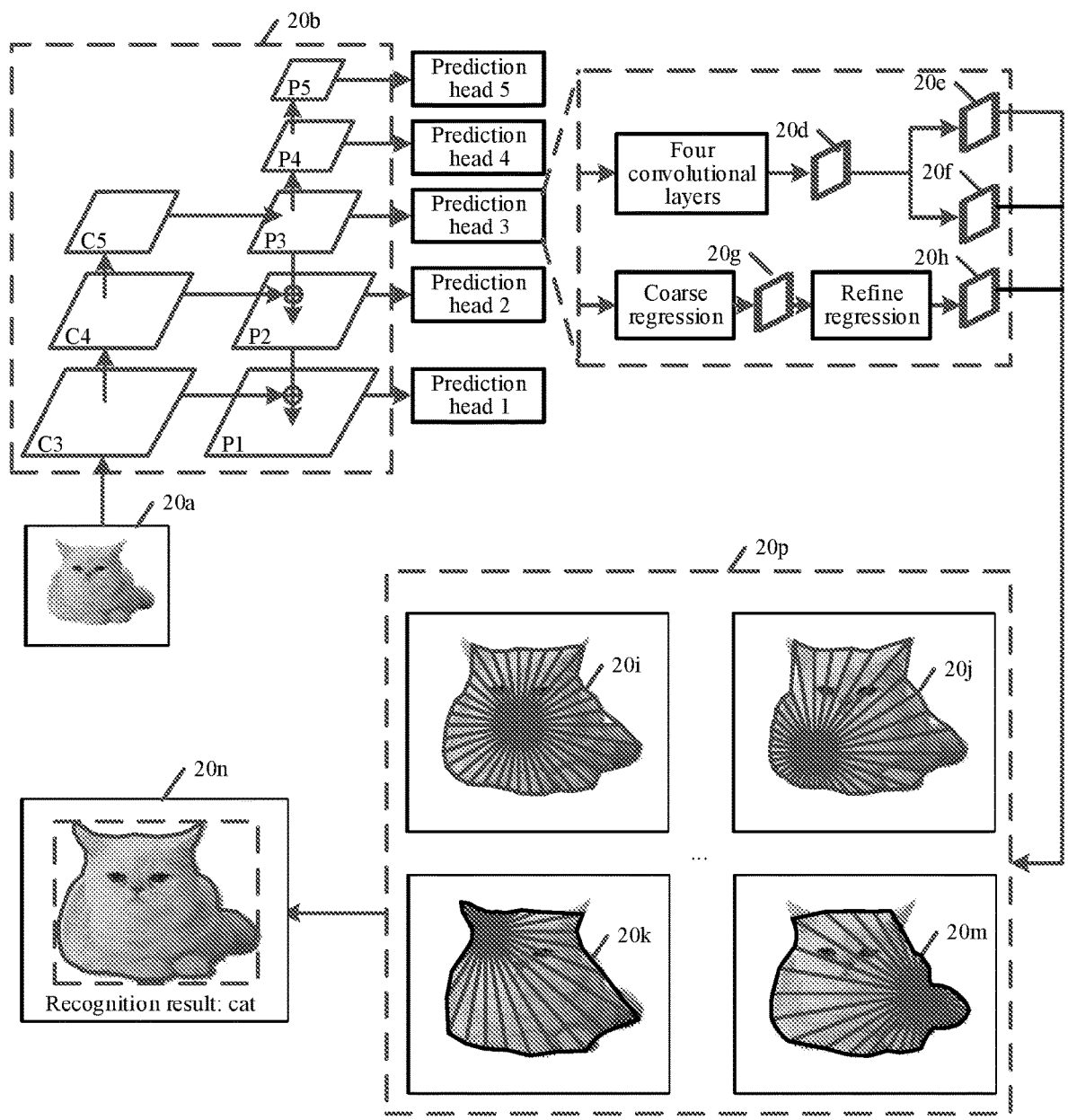
FIG. 2 is a schematic diagram of an image instance segmentation scene according to an embodiment of this disclosure.

Further refer to FIG. 2, FIG. 2 being a schematic diagram of an image instance segmentation scene provided by an embodiment of this disclosure. In this embodiment of this disclosure, the instance segmentation process of the image is described with taking the user terminal 10*a* shown in FIG. 1 above as an example. As shown in FIG. 2, the user terminal 10*a* may acquire a source image 20*a* that requires instance segmentation. The source image 20*a* may be a photo taken with a camera device (e.g., a single-lens reflex camera, a mobile phone camera, a traffic camera, etc.), or a picture downloaded from the Internet.

The user terminal 10*a* acquires an image segmentation model, the image segmentation model including a feature extractor 20*b*, a classification component and a regression component; where the feature extractor 20*b* is configured to extract multi-scale features in the source image 20*a*; the classification component is configured to predict the category of an object contained in the source image 20*a* and the center point of the object contained in the source image 20*a* (also may be understood as an instance center); and the regression component is configured to predict polar radii of the object contained in the source image 20*a*. An image instance segmentation task is converted by the image segmentation model into two parallel tasks: an instance center classification task and a distance regression task. The instance center classification task is completed by the classification component, and the distance regression task is completed by the regression component. The distance regression involved in this disclosure may be represented by the polar radii in the polar coordinate system.

The user terminal 10*a* inputs the source image 20*a* into the image segmentation model. The source image 20*a* is first inputted into the feature extractor 20*b* of the image segmentation model. Residual feature maps with different sizes are outputted by a residual component in the feature extractor 20*b* in sequence. For example, a residual feature map C1, a residual feature map C2, a residual feature map C3, a residual feature map C4 and a residual feature map C5 can be outputted in sequence, and the above five residual feature maps are arranged from large to small: the residual feature map C1→the residual feature map C2→the residual feature map C3→the residual feature map C4→the residual feature map C5. Then, the residual feature map C3, the residual feature map C4 and the residual feature map C5 are used as input of a feature fusion component in the feature extractor 20*b*, and features are further extracted by the feature fusion component, for example, an up-sampling operation can be performed on the residual feature map C4 and residual feature map C5, such that the residual feature map C5 up-sampled and the residual feature map C4 up-sampled have a same size, and the residual feature map C4 up-sampled and the residual feature map C3 up-sampled have a same size. Subsequently, element summation is performed on the residual feature map C5 up-sampled and the residual feature map C4 up-sampled to obtain an object feature map P2 fused. Element summation is performed on the residual feature map C4 up-sampled and the residual feature map C3 up-sampled to obtain an object feature map P1 fused. An object feature map P3 can be obtained based on the residual feature map C5. An object feature map P4 is obtained by performing a down-sampling operation on the object feature map P3. Of course, the down-sampling operation can be further performed on the object feature map P4 to obtain an object feature map P5. In other words, the object feature map P1, the object feature map P2, the object feature map P3, the object feature map P4 and the object feature map P5 are outputted by the feature fusion component in the feature extraction component 20b.

Further, the object feature map P1, the object feature map P2, the object feature map P3, the object feature map P4 and the object feature map P5 can be predicted independently. For example, the object feature map P1 can be predicted in a prediction head 1, and the object feature map P2 can be predicted in a prediction head 2, and so on. In this embodiment of this disclosure, the prediction process of each object feature map is the same. The prediction process of the object feature map is described below with taking the prediction head 3 corresponding to the object feature map P3 as an example. The prediction head 3 includes a classification component and a regression component. The object feature map P3 is convolved by four convolutional layers in the classification component to obtain an image feature 20d (the image feature 20d may be understood as an object classification feature map corresponding to the object feature map P3). Then the image feature enters a category prediction subcomponent and a center prediction subcomponent in the classification component. Category confidence levels 20e that pixel points in the object feature map P3 belong to different categories respectively are outputted by a category prediction subcomponent, and center confidence levels 20f corresponding to the pixel points in the object feature map P3 are outputted by a center prediction subcomponent. Where the category confidence level 20e is used for determining the classification result of the object contained in the source image 20a, and the center confidence level 20f is used for determining the center point of the object contained in the source image 20a.

In some embodiments, the regression component in the prediction head 3 includes a coarse regression module and a refine regression module, that is, a coarse-to-fine strategy is introduced into the regression component. After the object feature map P3 is inputted to the regression component, initial predicted polar radii 20g corresponding to pixel points in the object feature map P3 are outputted by the coarse regression module. Then, the object feature map P3 and the initial predicted polar radii 20g are used as input of the refine regression module, and in the refined regression module, contour sampling points are determined from the object feature map P3 based on the initial predicted polar radii 20g. By calculating polar radius deviations corresponding to the contour sampling points, the sum of the initial predicted polar radius 20g and the polar radius deviation may be used as a target predicted polar radius 20h outputted from the refine regression module. A candidate edge shape of the object contained in the source image 20a is generated based on the target predicted polar radii 20h corresponding to the pixel points in the object feature map P3, and the generated candidate edge shape is added to a candidate edge shape set 20p. Where for any pixel point in the object feature map P3, the number of its corresponding target predicted polar radii is 36. These 36 target predicted polar radii have an equal angular spacing (a spacing angle between two adjacent target predicted polar radii may be 10 degrees). A candidate edge shape is obtained by connecting the endpoints of the 36 target predicted polar radii. For each object feature map outputted from the feature fusion component, the above operations can be performed to generate the candidate edge shapes associated with the pixel points in each object feature map, and the candidate edge shapes associated with each object feature map are added to the candidate edge shape set 20p. For example, the candidate edge shape set 20p includes a candidate edge shape 20i, a candidate edge shape 20j, a candidate edge shape 20k, a candidate edge shape 20m and the like.

The user terminal 10a determines a weight (also referred to as a segmentation confidence level) corresponding to each candidate edge shape in the candidate edge shape set 20p based on the category confidence levels and the center confidence levels of the pixel points covered by the candidate edge shape in the source image 20a, and then non-maximum suppression (NMS) can be performed, based on the weight, on all the candidate edge shapes contained in the candidate edge shape set 20p. A final object edge shape is determined from the source image 20a. The object edge shape may refer to the predicted contour boundary of the object contained in the source image 20a. At the same time, it is determined, based on the category confidence levels of the pixel points covered by the object edge shape, that the classification result of the object contained in the source image 20a is: cat. In other words, by performing image instance segmentation on the source image 20a, not only can the contour boundary, in the source image 20a, of the object contained in the source image 20a be accurately detected, but also the classification result of the object contained can be recognized. In this embodiment of this disclosure, for the instance segmentation process of the source image 20a, the coarse-to-fine strategy can be introduced into the regression component. The accuracy of polar radius regression can be improved by the coarse regression module and the refine regression module, and then the accuracy of object edge segmentation can be improved.

Figure 3:
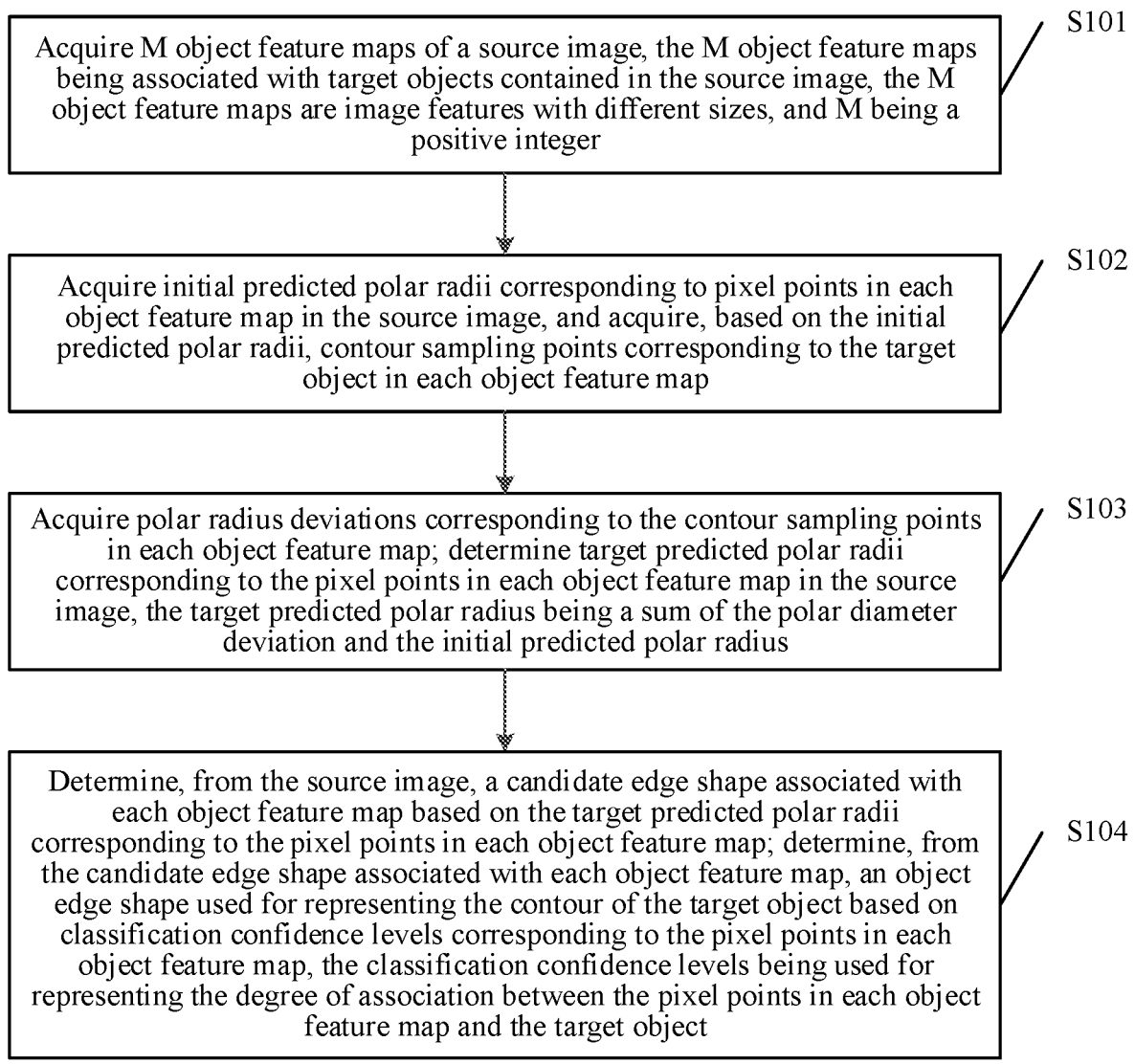
FIG. 3 is a schematic flowchart of an image data processing method according to an embodiment of this disclosure.

Refer to FIG. 3, FIG. 3 being a schematic flowchart of an image data processing method provided by an embodiment of this disclosure. It is to be understood that the image data processing method is executed by a computer device. The computer device is a user terminal, or a server, or a system comprised of a user terminal and a server, or a computer program application (including a program code), which will not be specifically limited herein. As shown in FIG. 3, the image data processing method may include the following steps:

Step S101: Acquire the M object feature maps of the source image, the M object feature maps being associated with the target objects contained in the source image, the M object feature maps being the image features with different sizes, and M being a positive integer.

In some embodiments, the computer device acquires a source image (such as the source image 20a in the corresponding embodiment in FIG. 2 above) that requires image instance segmentation. The source image includes one or more instances. One or more instances contained in the source image are referred to as a target object in this embodiment of this disclosure. The purpose of performing image instance segmentation on the source image is to find the target objects contained in the source image, and recognize and segment the target objects found out. Where the target object may include but is not limited to: people, animals, plants, vehicles, traffic signs, road obstacles, signs and slogans.

The computer device acquires a target image segmentation model (which may be understood as an image segmentation model that has been trained and can be applied to an image instance segmentation scene). The target image segmentation model is configured to predict the classification result of the target object contained in the source image, and the contour boundary of the target object contained in the source image (also referred to as the object edge shape). The target image segmentation model may include a feature extractor, a classification component and a regression component, where the feature extractor may include a residual component and a feature fusion component. In some embodiments, the residual component is a residual network (ResNet). The number of network layers of the residual network is designed according to actual needs. In some embodiments, the feature fusion component is a feature pyramid network (FPN). After being acquired, the source image containing the target objects is inputted into the target image segmentation model. N residual feature maps associated with the target objects are acquired from the source image on the basis of the residual component in the target image segmentation model, where the N residual feature maps may be features outputted from different network layers in the residual component. N is a positive integer, for example, N may be 1, 2, 3 and the like. In the feature fusion component of the target image segmentation model, feature fusion is performed on the N residual feature maps to obtain the M object feature maps corresponding to the target object. M may be a positive integer, for example, M may be 1, 2, 3 and the like.

Where the network layers contained in the residual component may be divided into multiple stages. Each stage includes one or more residual blocks. One residual block refers to a one-layer or multi-layer network containing a "shortcut connection". The number of the stages contained in the residual component, the number of the residual blocks contained in each stage, and the number of the network layers contained in each residual block will not be limited in this disclosure. The residual feature maps outputted from each stage of the residual component may have different sizes, for example, the size of the residual feature map outputted in stage 1 may be ½ of the size of the source image, the size of the residual feature map outputted in stage 2 may be ¼ of the size of the source image, and the size of the residual feature map outputted in stage 3 may be ⅛ of the size of the source image, and so on. The computer device selects N residual feature maps from the residual feature maps, outputted from multiple stages of the residual component, as the input of the feature fusion component. Feature fusion is performed on the N residual feature maps by the feature fusion component to obtain the M object feature maps with different sizes, where N may be a positive integer less than or equal to the number of the stages in the residual component.

Figure 4:
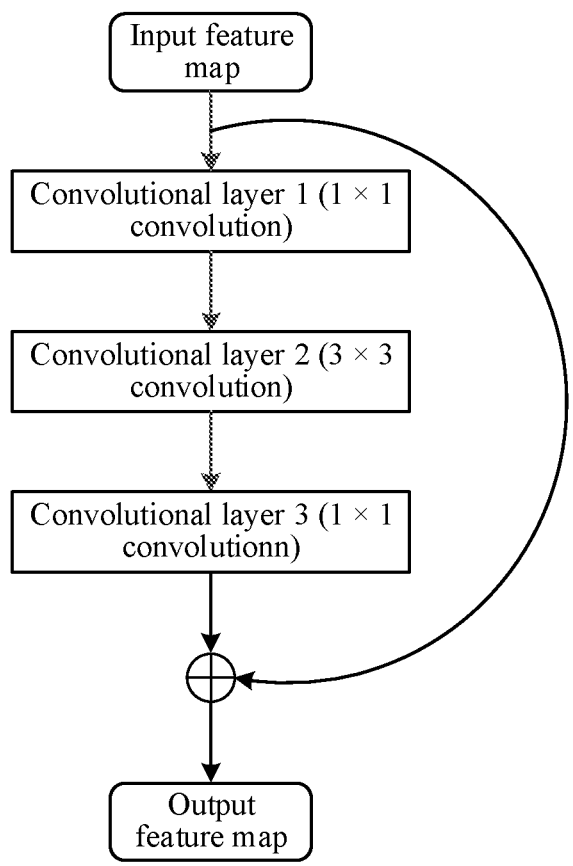
FIG. 4 is a structural schematic diagram of a residual block according to an embodiment of this disclosure.

Refer to FIG. 4, FIG. 4 being a structural schematic diagram of a residual block provided by an embodiment of this disclosure. The residual block, as shown in FIG. 4, includes a convolutional layer 1, a convolutional layer 2, a convolutional layer 3 and a shortcut connection, where the convolutional layer 1 may perform convolution processing by using a convolution kernel with the size of 1×1, the convolutional layer 2 may perform convolution processing by using a convolution kernel with the size of 3×3, and the convolutional layer 3 may perform convolution processing also by using the convolution kernel with the size of 1×1. For an input feature map $f_{in}$ inputted into the residual block, a residual mapping feature map $f_r$ can be obtained after the input feature map passes through the convolutional layer 1, the convolutional layer 2 and the convolutional layer 3 in sequence. The input feature map $f_{in}$ can be directly used as an identity mapping feature map $f_{ide}$ to perform element summation with the residual mapping feature map $f_r$ to obtain an output feature map four of the residual block, that is, $f_{out}=f_r+f_{ide}$, where the symbol "⊕" shown in FIG. 4 may be expressed as element-based addition, that is, the element summation is performed on the feature map. If the dimension of the residual mapping feature map $f_r$ is the same as that of the input feature map $f_{in}$, the element summation can be directly performed on the residual mapping feature map $f_r$ and the input feature map $f_{in}$ (the input feature map $f_{in}$ at this time is equivalent to the above identity mapping feature map $f_{ide}$) to obtain the output feature map $f_{out}$. If the dimension of the residual mapping feature map $f_r$ is different from that of the input feature map $f_{in}$, it is necessary to perform linear mapping on the input feature map $f_{in}$ to match the dimension of the residual mapping feature map $f_r$. The input feature map $f_{in}$ linearly mapped may be referred to as the identity mapping feature map $f_{ide}$. The output feature map four is obtained by performing the element summation on the residual mapping feature map $f_r$ and the identity mapping feature map $f_{ide}$.

In an exemplary implementation, it is specifically illustrated with taking the residual component including five stages as an example in this embodiment of this disclosure. The residual feature maps outputted in the five stages of the residual component may be expressed in sequence: the residual feature map C1, the residual feature map C2, the residual feature map C3, the residual feature map C4, and the residual feature map C5. When the computer device selects two consecutive residual feature maps from the residual feature maps, outputted in the five stages of the residual component, as the input of the feature fusion component, the N residual feature maps selected at this time may include a first residual feature map (for example, the residual feature map C4) and a second residual feature map (for example, the residual feature map C5), and the size of the residual feature map C4 outputted in stage 4 is larger than that of the residual feature map C5 outputted in stage 5. The first residual feature map and the second residual feature map can be convolved in the feature fusion component of the target image segmentation model to obtain a first convolved feature map corresponding to the first residual feature map and a second convolved feature map corresponding to the second residual feature map. The up-sampling operation is performed on the second convolved feature map to obtain an up-sampled feature map. The size of the up-sampled feature map is the same as that of the first convolved feature map. A combination of the first convolved feature map and the up-sampled feature map is determined as a fused feature map, that is, features at different tiers can be fused, such that the fused feature map may contain rich semantic information and accurate position information. The down-sampling operation can be performed on the second convolved feature map to obtain a down-sampled feature map. The M object feature maps corresponding to the target objects can be determined based on the fused feature map, the second convolved feature map and the down-sampled feature map. The M object feature maps with different sizes can be outputted by the feature fusion component, such that extracted object feature maps can better cope with the multi-scale (that is, multi-size) change problem of the objects in image instance segmentation.

Figure 5:
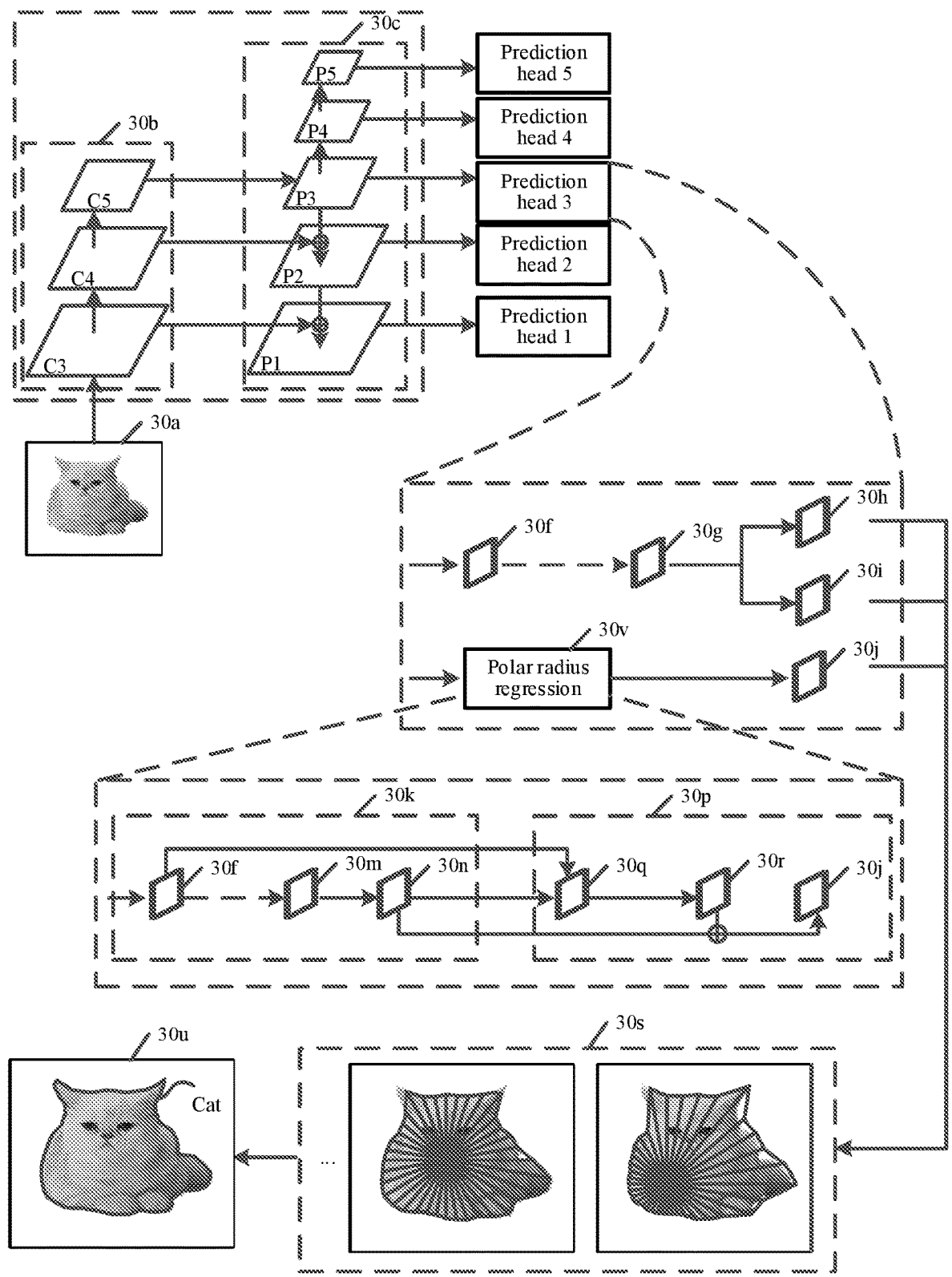
FIG. 5 is a schematic diagram of an image instance segmentation scene according to an embodiment of this disclosure.

In an exemplary implementation, further refer to FIG. 5, FIG. 5 being a schematic diagram of an image instance segmentation scene provided by an embodiment of this disclosure. As shown in FIG. 5, for a source image 30a, the residual feature map C1 can be outputted to the residual feature map C5 by a residual component 30b in the target image segmentation model, and then, the computer device can use the residual feature map C3, the residual feature map C4 and the residual feature map C5 as input of a feature fusion component 30c. The residual feature map C3, the residual feature map C4 and the residual feature map C5 each pass through a convolutional layer (using the convolution kernel with the size 3×3), to obtain a convolved feature map $P_1'$ corresponding to the residual feature map C3, a convolved feature map $P_2'$ corresponding to the residual feature map C4, and a convolved feature map $P_3'$ corresponding to the residual feature map C5, where the up-sampling operation can be performed on the convolved feature map $P_2'$ to obtain an up-sampled feature map $P_1''$, and the up-sampling operation is performed on the convolved feature map $P_3'$ to obtain an up-sampled feature map $P_2''$. Then element summation can be performed on the convolved feature map $P_1'$ and the up-sampled feature map to obtain a fused feature map $P_1'''$ (i.e., $P_1'''=P_1'+P_1''$, the features at different tiers can be fused), and element summation is performed on the convolved feature map $P_2'$ and the up-sampled feature map $P_2''$ to obtain a fused feature map $P_2'''$ (i.e., $P_2'''=P_2'+P_2''$). Further, the fused feature map $P_1'''$, the fused feature map $P_2'''$ and the convolved feature map $P_3'$ can be convolved by using the convolution kernel with the size of 1×1 to obtain the object feature map P1 corresponding to the fused feature map $P_1'''$, the object feature map P2 corresponding to the fused feature map TT, and the object feature map P3 corresponding to the convolved feature map $P_3'$. The use of 1×1 convolution here can eliminate an aliasing effect achieved by direct addition of the feature maps. In order to represent an object of a larger size, the down-sampling operation can be performed on the object feature map P3 to obtain the object feature map P4, and then the down-sampling operation can also be performed on the object feature map P4 to obtain the object feature map P5. In other words, the object feature maps P1 with different sizes can be outputted to the object feature map P5 by the feature fusion component 30c. At this time, the number M of the object feature maps may be taken as 5.

When segmentation is performed based on the target image segmentation model, classification confidence levels corresponding to pixel points in each object feature map are acquired based on the M object feature maps, where the classification confidence levels are used for representing the degree of association between the pixel points in each object feature map and the sample object.

In some embodiments, the computer device independently predicts the M object feature maps (the object feature map P1 to the object feature map P5) to predict a category and polar radii for a target object. For example, the object feature map P1 can be predicted in the prediction head 1, and the object feature map P2 can be predicted in the prediction head 2, and so on. Each prediction head may include a classification component and a regression component. Both the classification component and the regression component may be of a fully convolutional network (FCN) structure. An input feature map and an output feature map of the FCN have a same size. Each object feature map can enter the classification component and the regression component of the prediction head. The classification confidence levels corresponding to the pixel points in each object feature map can be outputted by the classification component. The classification confidence levels may be used for representing the degree of association between the pixel points in each object feature map and the target object.

In an exemplary implementation, when the classification component includes the category prediction subcomponent and the center prediction subcomponent, the classification confidence level at this time includes the category confidence level outputted from the category prediction subcomponent and the center confidence level outputted from the center prediction subcomponent. For any object feature map $P_i$ (i is a positive integer less than or equal to M) of the M object feature maps, an object classification feature map corresponding to the object feature map $P_i$ is acquired in the classification component of the target image segmentation model. Then pixel category classification is performed on the object classification feature maps on the basis of the category prediction subcomponent in the classification component to obtain category confidence levels that the pixel points in the object feature map $P_i$ belong to L categories respectively. The target image segmentation model can be configured to recognize objects corresponding to the L categories, that is, the number of all categories that the target image segmentation model can recognize is L. L is a positive integer, for example, L may be taken as 1, 2 and the like. Pixel center classification is performed on the object classification feature map on the basis of the center prediction subcomponent in the classification component to obtain the center confidence levels of the pixel points in the object feature map $P_i$ in an image region where the target object is located. The center confidence level may be used for representing the distance between the pixel point in the object feature map P1 and the center point of the image region where the target object is located.

As shown in FIG. 5, the prediction process of the object feature map P3 is described with taking the object feature map P3 as an example. Assume that the size of the object feature map P3 is H×W, the object feature map P3 is represented as a feature 30f after being inputted into the prediction head 3. This feature 30f is a feature map (the size may be H×W×256) with the number of channels of 256 dimensions. In the classification component, the feature 30f passes through four convolutional layers (the four convolutional layers here all use the convolution kernel with the size of 3×3) to obtain an image feature 30g (the image feature 30g may be the object classification feature map used for classification, the size of which may be H×W×256). The image feature 30g enters the category prediction subcomponent and the center prediction subcomponent. Pixel category classification is performed, in the category prediction subcomponent, on the image feature 30g, to obtain category confidence levels 30h (the size may be H×W×L) that the pixel points in the object feature map P3 belong to L categories respectively. The pixel center classification is performed, in the center prediction sub-component, on the image feature 30g, to obtain the center confidence levels 30i (the size may be H×W×1) of the pixel points in the object feature map P3 in the image region where the corresponding target object is located. If the number L of the categories that can be recognized by the target image segmentation model is 80, the size of the category confidence level 30g may be expressed as H×W×80. For example, for any pixel point S in the object feature map P3, a 80-dimensional value in the category confidence levels 30g may be used for representing the probability that the target objects corresponding to the pixel point S belong to 80 categories respectively. A one-dimensional real number in the center confidence level 30i is used for representing the center-ness of the pixel point S in the image region where the corresponding target object is located. The greater the center-ness, the closer the distance between the pixel point S and the actual center point of the target object, and the higher the predicted polar radius quality of the pixel point S. The smaller the center-ness, the farther the distance between the pixel point S and the actual center point of the target object, and the lower the predicted polar radius quality of the pixel point S.

Step S102: Acquire initial predicted polar radii corresponding to pixel points in each object feature map in the source image, and acquire, from each object feature map, contour sampling points corresponding to the target object based on the initial predicted polar radii, a contour comprised of the sample contour sampling points being associated with the contour of the sample object.

Specifically, for any object feature map $P_i$ of the M object feature maps, the object feature map $P_i$ is convolved in the regression component of the target image segmentation model to obtain a distance prediction feature map corresponding to the object feature map $P_i$; pixel points in the distance prediction feature map are determined as candidate centers, and initial predicted polar radii corresponding to the candidate centers are acquired based on the distance prediction feature map; and sampling feature coordinates are determined based on the initial predicted polar radii and the pixel points in the object feature map $P_i$, and contour sampling points matching the sampling feature coordinates are acquired from the object feature map $P_i$.

As shown in FIG. 5, when i=3, the object feature map P may be expressed as the image feature 30f of H×W×256 after being inputted into a polar radius regression component 30v (i.e., the above regression component). The polar radius regression component 30v includes a coarse regression module 30k and a refine regression module 30p. In the coarse regression module 30k, the image feature 30f passes through four convolutional layers (the four convolutional layers here all use the convolution kernel with the size of 3×3) to obtain an image feature 30m (the image feature 30m may be understood as the distance prediction feature map for polar radius regression, the size of which may be H×W×256). An initial predicted polar radius 30n is predicted by each 1×1×256-dimensional vector in the distance prediction feature map. The size of the initial predicted polar radius 30n may be H×W×36, that is, the contour of the target object may be comprised of 36 polar radii. Further, the initial predicted polar radius 30n and the image feature 30f are both inputted into the refine regression module 30p. The refine regression module 30p is comprised of a coordinate conversion layer, a feature sampler and a refine regressor. The sampling feature coordinates required for the refine regression are calculated by the coordinate conversion layer using the initial predicted polar radius 30n, and then contour sampling points matching the sampling feature coordinates are acquired from the object feature map P3. For any pixel point S $(x_c, y_c)$ in the object feature map P3, the calculation process of the sampling feature coordinates may be expressed as:

$$x_k = x_c + r_{coarse}^k \times \sin\theta_k / d,$$

$$y_k = y_c + r_{coarse}^k \times \cos\theta_k / d, \quad (1)$$

Where d in the above formula (1) may be expressed as a down-sampling stride of the object feature map P3, $r_{coarse}^k$ is expressed as a $k^{th}$ initial predicted polar radius corresponding to the pixel point S $(x_c, y_c)$, k=1, 2, ..., 36. k here represents the sampling point number of the contour of the target object; $\theta_k$ is expressed as a polar angle of the $k^{th}$ initial predicted polar radius corresponding to the pixel point S $(x_c, y_c)$, $\theta_1$ is 0 degree, $\theta_2$ may be 10 degrees, $\theta_3$ may be 30 degrees, ..., $\theta_{36}$ may be 350 degrees; $(x_k, y_k)$ represents $k^{th}$ sampling feature coordinates in the object feature map P3, and then 36 contour sampling points are sampled in the object feature map P3 on the basis of 36 sampling feature coordinates. Since the value range of $r_{coarse}^k$ is consistent with an input image, but the contour sampling points are on the object feature map P3, it is necessary to scale the calculated coordinates with the down-sampling stride d of the object feature map P3.

Step S103: Acquire the polar radius deviations corresponding to the contour sampling points in each object feature map; determine the target predicted polar radii corresponding to the pixel points in each object feature map in the source image, the target predicted polar radius being the sum of the polar radius deviation and the initial predicted polar radius.

Taking the object feature map P3 as an example, the feature sampler in the refine regression module performs sampling in the object feature map P3 on the basis of the sampling feature coordinates of the contour sampling points to obtain the polar radius deviations corresponding to the contour sampling points, and then the sum of the initial predicted polar radius and the polar radius deviation can be determined as the target predicted polar radius outputted from the refine regression module. In an exemplary implementation, the number of the contour sampling points is K, and K is a positive integer, for example, K may be taken as 36. Sampling feature vectors corresponding to the K contour sampling points respectively in the object feature map $P_i$ (for example, the object feature map P3) are acquired, and the K sampling feature vectors are superimposed to obtain contour feature vectors corresponding to the target object. The contour feature vectors are convolved according to K group convolutions to obtain polar radius deviations corresponding to the K contour sampling points. The K initial predicted polar radii and the corresponding polar radius deviations are added to obtain K target predicted polar radii.

As shown in FIG. 5, the computer device performs sampling in the object feature map P3 (the image feature 30f) on the basis of the sampling feature coordinates $(x_k, y_k)$ by the feature sampler in the refine regression module 30p to obtain 36 sampling feature vectors with the size of (1, 1, c). Subsequently, the 36 sampling feature vectors are superimposed on the basis of the dimension of the number of channels to obtain a contour feature vector 30q. Since the sampling feature coordinates $(x_k, y_k)$ may be decimals, sampling can be performed in the object feature map P3 by using a bilinear sampling kernel to acquire the contour feature vector 30q. Then the contour feature vector 30q is inputted into a refine regressor $\Phi_r$ of the refine regression module 30p. Each contour sampling point is regressed for a polar radius deviation 30r by using a convolutional layer (using the convolution kernel with the size of 1×1) with a group number of 36. The polar radius deviation 30r is expressed as $\Phi_r(g)$, and then the sum of the initial predicted polar radius 30n and the polar radius deviation $\Phi_r(g)$ is determined as a target predicted polar radius 30j finally outputted from the regression component. The size of the target predicted polar radius 30j may be H×W×36. The calculation process of the target prediction polar radius 30j may be expressed as: $r = r_{coarse} + \Phi_r(g)$, where r may be expressed as the target predicted polar radius corresponding to the above pixel point S $(x_c, y_c)$, $r_{coarse}$ is expressed as the initial predicted polar radius corresponding to the pixel point S $(x_c, y_c)$, and g is expressed as the contour feature vector 30q corresponding to the pixel point S $(x_c, y_c)$. Based on the same operations above, the classification confidence level, the center confidence level and the target predicted polar radius corresponding to each pixel point in the M object feature maps can be acquired.

Step S104: Determine, from the source image, a candidate edge shape associated with each object feature map based on the target predicted polar radius corresponding to the pixel point in each object feature map; determine, from the candidate edge shape associated with each object feature map, the object edge shape used for representing the contour of the target object based on the classification confidence levels corresponding to the pixel points in each object feature map, the classification confidence levels being used for representing the degree of association between the pixel points in each object feature map and the target object.

In some embodiments, after the computer device generates the category confidence levels, the center confidence levels and the target predicted polar radii corresponding to the pixel points in each object feature map by the target image segmentation model, post-processing can be performed using an NMS algorithm, and the object edge shape corresponding to the target object is determined from the source image, as well as the object classification result of the target object. For the object feature map $P_i$ of the M object feature maps, the computer device acquires any pixel point $S_j$ from the object feature map $P_i$, where i may be a positive integer less than or equal to M, and j may be a positive integer less than or equal to the number of pixels contained in the object feature map $P_i$. The endpoints of the target prediction polar radii corresponding to the pixel points $S_j$ are connected in the source image, to generate candidate edge shapes $B_j$ centered on the pixel $S_j$. Then the candidate edge shapes associated with the pixel points in each object feature map can be each added to the candidate edge shape set corresponding to the target object.

Further, candidate pixel points covered by the candidate edge shape $B_j$ in the candidate edge shape set are acquired from the source image; the segmentation confidence level corresponding to the candidate edge shape $B_j$ is determined based on a product between the category confidence level corresponding to the candidate pixel point and the center confidence levels corresponding to the candidate pixel point. Then the object edge shape used for representing the contour of the target object can be determined from the candidate edge shape set based on the segmentation confidence level of the candidate edge shape in the candidate edge shape set. Then the target pixel points covered by the object edge shape in the source image can be acquired, and the object classification result corresponding to the target object can be determined based on the category confidence levels corresponding to the target pixel points. As shown in FIG. 5, the candidate edge shape set $30s$ contains candidate edge shapes associated with each object feature map. Each candidate edge shape is associated with the contour of the target object contained in the source image, and then the candidate edge shape can be determined from the candidate edge shape set by the NMS algorithm. The candidate edge shape determined at this time can be used as an object edge shape $30u$ used for representing the contour of the target object. It can be determined based on the category confidence levels of the pixel points covered by the object edge shape $30u$ that the object classification result of the target object contained in the source image $30a$ is: cat.

In an exemplary implementation, the process of determining the object edge shape by the NMS algorithm includes: sort, by the computer device, the candidate edge shapes in the candidate edge shape set by the segmentation confidence levels corresponding to the candidate edge shapes in the candidate edge shape set, and determine the candidate edge shape corresponding to maximum segmentation confidence level as a first target edge shape; determine the candidate edge shapes other than the first target edge shape in the candidate edge shape set as first remaining edge shapes, and acquire a first overlap degree between the first target edge shape and the first remaining edge shape, where the first overlap degree may be understood as intersection-over-Union (IoU) between the first target edge shape and the first remaining edge shape; delete, from the candidate edge shape set, the first remaining edge shape and the first target edge shape with the first overlap degree therebetween greater than an overlap threshold to obtain an updated candidate edge shape set, and determine the first remaining edge shape corresponding to the maximum segmentation confidence level in the updated candidate edge shape set as a second target edge shape; and determine the first remaining edge shapes other than the second target edge shape in the updated candidate edge shape set as second remaining edge shapes, and determine the first target edge shape and the second target edge shape as object edge shapes corresponding to the target object, when a second overlap degree between the second target edge shape and the second remaining edge shape is greater than the overlap threshold. The above process of deleting from the candidate edge shape set may be understood as a filtering process, that is, filtering out the first remaining edge shape and the first target edge shape with the first overlap degree therebetween greater than the overlap threshold.

By way of examples, assume that the candidate edge shape set may include six candidate edge shapes. The six candidate edge shapes are sorted from large to small by the segmentation confidence levels corresponding to the six candidate edge shapes. The six candidate edge shapes sorted are respectively represented as: a candidate edge shape A, a candidate edge shape B, a candidate edge shape C, a candidate edge shape D, a candidate edge shape E, and a candidate edge shape F. The candidate edge shape A can be determined as the first target edge shape, and overlap degrees (i.e., the first overlap degree) respectively between the candidate edge shape A and the candidate edge shape B, between the candidate edge shape A and the candidate edge shape C, between the candidate edge shape A and the candidate edge shape D, between the candidate edge shape A and the candidate edge shape E between the candidate edge shape A and the candidate edge shape F are acquired. If the overlap degrees respectively between the candidate edge shape A and the candidate edge shape B and between the candidate edge shape A and the candidate edge shape C are each greater than the overlap threshold (the overlap threshold may be set manually, for example, the overlap threshold may be set to 0.5), the candidate edge shape B and the candidate edge shape C can be deleted from the candidate edge shape set, and the candidate edge shape A is marked to indicate that the candidate edge shape A is a reserved candidate edge shape. Then the candidate edge shape D (i.e., the second target edge shape) with the maximum segmentation confidence level can be selected from the remaining candidate edge shape D, candidate edge shape E and candidate edge shape F, and then overlap degrees (i.e., the second overlap degree) respectively between the candidate edge shape D and the candidate edge shape E and between the candidate edge shape D and the candidate edge shape F can be acquired. The candidate edge shape with the overlap degree greater than the overlap threshold is deleted, and the candidate edge shape D is marked to indicate that the candidate edge shape D is a reserved candidate edge shape, and so on, until all the reserved candidate edge shapes are found out. Then the object edge shape used for representing the contour of the target object can be determined based on the reserved candidate edge shape. When the source image contains multiple target objects, the object edge shape corresponding to each target object can be determined by the NMS algorithm, as well as the object classification result corresponding to each target object, that is, one target object in the source image corresponds to one object edge shape.

In an exemplary implementation, after the object edge shape used for representing the contour of the target object is determined from the source image, as well as the object classification result corresponding to the target object, the source image can be applied to scenes such as a video content understanding scene and an automatic driving scene. For example, in the video content understanding scene, the source image may be a video frame, which is conducive to accurately understanding video contents after the object edge shapes corresponding to all target objects contained in the video frame are determined, as well as the object classification results corresponding to all the target objects. In the automatic driving scene, target objects such as lanes, vehicles, traffic signs, traffic landmarks, traffic cameras and camera support bars contained in the source image can be found by the target image segmentation model, and are recognized and segmented, which is conducive to assisting an autonomous vehicle in adjusting a driving direction and a driving lane.

In this embodiment of this disclosure, in the segmentation process of the source image, the M object feature maps with different sizes can be obtained by performing feature extraction on the source image. While the classification confidence levels corresponding to the pixel points in each object feature map are acquired, the initial predicted polar radii corresponding to the pixel points in each object feature map may also be acquired. The initial predicted polar radii are refined based on the polar radius deviations corresponding to the contour sampling points in each object feature map to acquire the target predicted polar radii corresponding to the pixel points in each object feature map, which can improve the regression accuracy of the target predicted polar radius. Then the object edge shape of the target object contained in the source image can be determined based on the target predicted polar radii and the classification confidence levels, thereby improving the accuracy of image segmentation.

In an exemplary implementation, before the target image segmentation model is used, it is necessary to train the target image segmentation model. For the convenience of description, the image segmentation model that has not been trained is referred to as an initial image segmentation model. The training process of the initial image segmentation model will be described below from FIG. 6 to FIG. 9.

Figure 6:
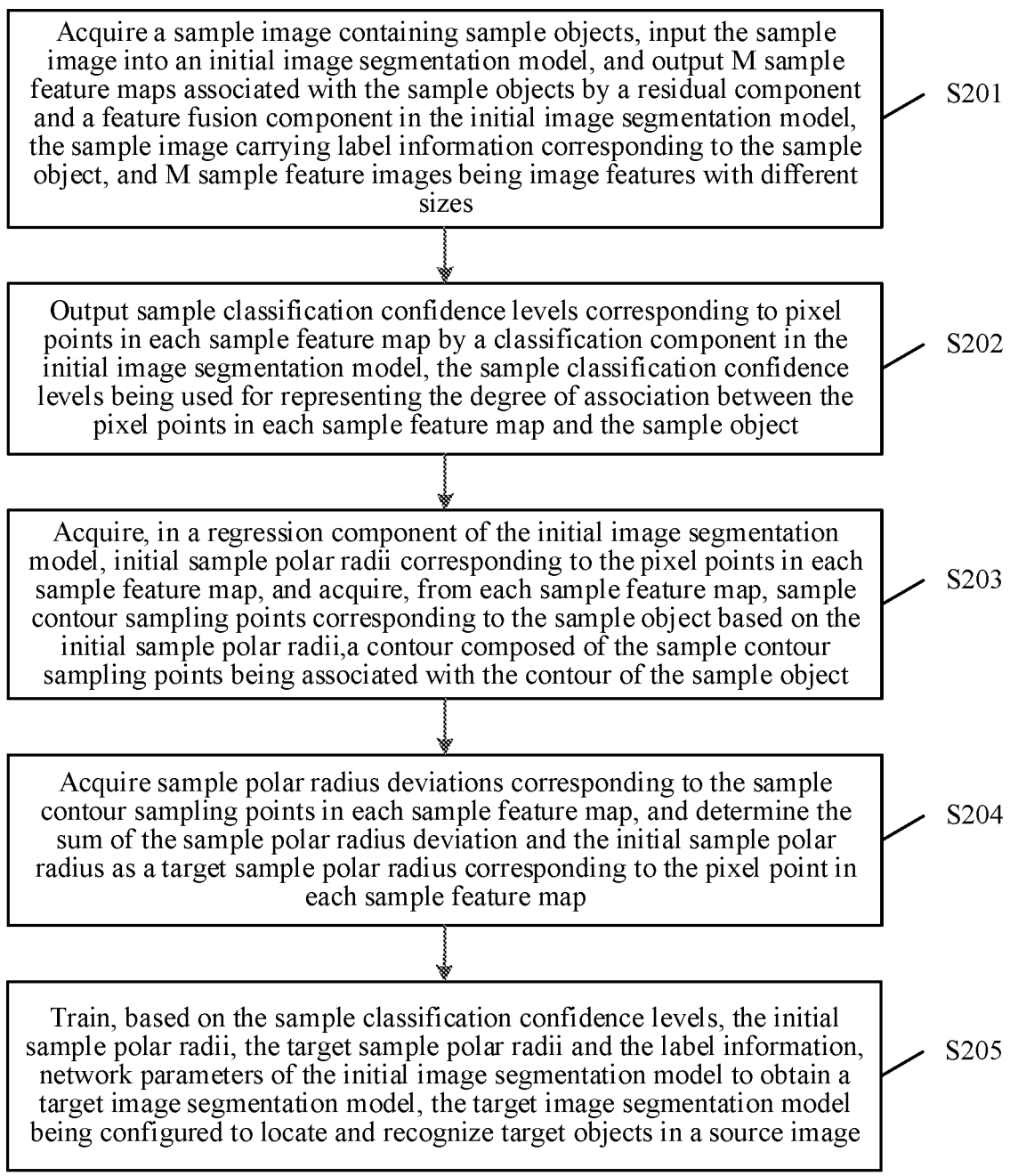
FIG. 6 is a schematic flowchart of an image data processing method according to an embodiment of this disclosure.

Refer to FIG. 6, FIG. 6 being a schematic flowchart of an image data processing method provided by an embodiment of this disclosure. It is to be understood that the image data processing method can be executed by a computer device. The computer device may be a user terminal, or a server, or a system comprised of a user terminal and a server, or a computer program application (including a program code), which will not be specifically limited herein. As shown in FIG. 6, the image data processing method may include the following steps:

Step S201: Acquire a sample image containing sample objects, input the sample image into the initial image segmentation model, and output M sample feature maps associated with the sample object by the residual component and the feature fusion component in the initial image segmentation model, the sample image carrying label information corresponding to the sample object, the M sample feature images being image features with different sizes, and M being a positive integer.

Specifically, the computer device may acquire a sample image used for training the initial image segmentation model. The sample image may include one or more sample objects, and the sample object may carry the label information corresponding to the one or more sample objects, where the label information may include a category label corresponding to the sample object, and the labeled contour shape of the sample object. The computer device can acquire an initialized image segmentation model (which may be referred to as the initial image segmentation model), and the sample image is inputted into the initial image segmentation model. Sample residual feature maps corresponding to individual stages can be outputted in sequence by the residual component in the initial image segmentation model, and then N sample residual feature maps can be selected from the sample residual feature maps, outputted in the individual stage, as the input of the feature fusion component of the initial image segmentation model. Information fusion can be performed on the N sample residual feature maps by the feature fusion component to obtain M sample feature maps associated with the sample object, where the M sample feature maps may be image features with different sizes, and both M and N may be a positive integer. The initial image segmentation model may include a residual component, a feature fusion component, a classification component and a regression component. The residual component and the feature fusion component can be configured to extract features from the sample image. The classification component can be configured to predict the category of the sample object contained in the sample image, and the center confidence level corresponding to the sample object. The regression component can be configured to predict the polar radii of the sample object contained in the sample image. Where for the acquisition process of the M sample feature maps, refer to the description of the M object feature maps in step S101 above, which will not be repeated here.

Step S202: Output, by the classification component in the initial image segmentation model, sample classification confidence levels corresponding to pixel points in each sample feature map, the sample classification confidence levels being used for representing the degree of association between the pixel points in each object feature map and the sample object.

Specifically, after being acquired, the M sample feature maps can be independently predicted. For example, each sample feature map can be inputted into the classification component and the regression component. The sample classification confidence levels corresponding to the pixel points in each sample feature can be outputted by the classification component in the initial image segmentation model. Where the classification component in the initial image segmentation model may include a category prediction subcomponent and a center prediction subcomponent, and thus, the sample classification confidence level may include the category confidence level outputted from the category prediction subcomponent, and the center confidence level outputted from the center prediction subcomponent. The category confidence is used for representing the category of the sample object contained in the sample image, and the center confidence level may be used for representing the distance between the pixel point in the sample feature map and the center point of the image region where the sample object is located in the sample image, that is, the sample classification confidence levels may be used for representing the degree of association between the pixel points in each sample feature map and the sample object. For the acquisition process of the sample classification confidence level, refer to the description of classification confidence in step S101 above, which will not be repeated here.

Step S203: Acquire, in the regression component of the initial image segmentation model, initial sample polar radii corresponding to the pixel points in each sample feature map, and acquire, from each sample feature map, sample contour sampling points corresponding to the sample object based on the initial sample polar radii, a contour comprised of the sample contour sampling points being associated with the contour of the sample object.

Specifically, after the M sample feature maps are acquired, each sample feature map can be inputted into the regression component of the initial image segmentation model. The regression component may include a coarse regression module and a refine regression module. The initial sample polar radii corresponding to the pixel points in each sample feature map can be outputted by the coarse regression module. The sample contour sampling points corresponding to the sample object can be acquired from each sample feature map based on the initial sample polar radii, where the contour comprised of the sample contour sampling points may be used for representing the contour of the sample object contained in the sample image. Where for the specific implementation process of step S203, refer to the description in step S102 above, which will not be repeated here.

Step S204: Acquire a sample polar radius deviation corresponding to the sample contour sampling point in each sample feature map, and determine the sum of the sample polar radius deviation and the initial sample polar radius as a target sample polar radius corresponding to the pixel point in each sample feature map.

Specifically, the computer device can acquire, in the regression component of the initial image segmentation model, the sample polar radius deviation corresponding to the sample contour sampling point in each sample feature map by the refine regression module, and then the sum of the sample polar radius deviation and the initial sample polar radius is determined as the target sample polar radius corresponding to the pixel point in each sample feature map. Where for the specific implementation process of step S204, refer to the description of step S103, which will not be repeated here.

Step S205: Train, based on the sample classification confidence levels, the initial sample polar radii, the target sample polar radii and the label information, network parameters of the initial image segmentation model to obtain a target image segmentation model, the target image segmentation model being configured to locate and recognize the target object in the source image.

Where the training the network parameters of the initial image segmentation model may be understood as correction of the network parameters. In some embodiments, when the sample classification confidence level includes the sample category confidence level and the sample center confidence level, the computer device can determine a model loss function corresponding to the initial image segmentation model based on the sample category confidence levels, the sample center confidence levels, the initial sample polar radii, the target sample polar radii and the label information. The network parameters of the initial image segmentation model are corrected based on the model loss function. When the number of times of training of the initial image segmentation model meets a training termination condition, the initial image segmentation model meeting the training termination condition can be determined as the target image segmentation model. When the number of times of training of the initial image segmentation model does not meet the training termination condition, its network parameters are corrected for next iterative training based on the corrected network parameters until the training termination condition is met. Where the training termination condition may be a training convergence condition or a preset maximum number of iterations. The target image segmentation model trained may be configured to locate and recognize all target objects contained in the source image.

Where the determination process of the model loss function may include: the computer device can determine a classification loss function corresponding to the category prediction subcomponent in the initial image segmentation model based on the sample category confidence level and the category label in the label information; a center loss function corresponding to the center prediction subcomponent in the initial image segmentation model is determined based on the sample center confidence level and the labeled contour shape in the label information; a first regression loss function corresponding to the coarse regression module in the initial image segmentation model can be determined based on the initial sample polar radii and the labeled contour shape in the label information; a second regression loss function corresponding to the refine regression module in the initial image segmentation model is determined based on the initial sample polar radii and the labeled contour shape in the label information; and then the model loss function corresponding to the initial image segmentation model is determined based on the classification loss function, the center loss function, the first regression loss function and the second regression loss function.

In an exemplary implementation, the initial image segmentation model further includes a global contour perception component. The computer device inputs the sample feature map with the largest size in the M sample feature maps into the global contour perception component to acquire a sample contour probability map associated with the sample object. That is, the sample feature map with the largest size in the M sample feature maps is determined as an input feature map of the global contour perception component, and the input feature map is inputted to the global contour perception component; the input feature map is convolved in the global contour perception component to acquire the sample contour probability map associated with the sample object. Where since the regression component in the initial image segmentation model is trained with a single pixel in the sample feature map as a training sample, focusing on the individual information of the sample object, the global contour perception component is introduced into the initial image segmentation model. The initial image segmentation model can perform boundary pixel classification of the sample object for guiding the feature extractor (including the residual component and the feature fusion component) in the initial image segmentation model to encode global contour information of the sample object to implicitly assist polar radius regression in the regression component. The global contour perception component is only present in the training stage of the image segmentation model. After the training is completed, the global contour perception component will be removed, that is, the global contour perception component can be removed by the target image segmentation model, without affecting the prediction speed of the model. The regression accuracy of the polar radius can be improved by introducing the global contour perception component. The global contour perception component takes the sample feature map with the largest size as the input, and the sample feature map passes through four convolutional layers (the four convolutional layers may all use the convolution kernel with the size of 3×3) with channel numbers of 128, 64, 64 and 64 in sequence, and then a sample contour probability map with the same size as the input sample feature map can be obtained. Each pixel in the sample contour probability map may be used for representing the probability that a corresponding point is a boundary pixel.

Figure 7:
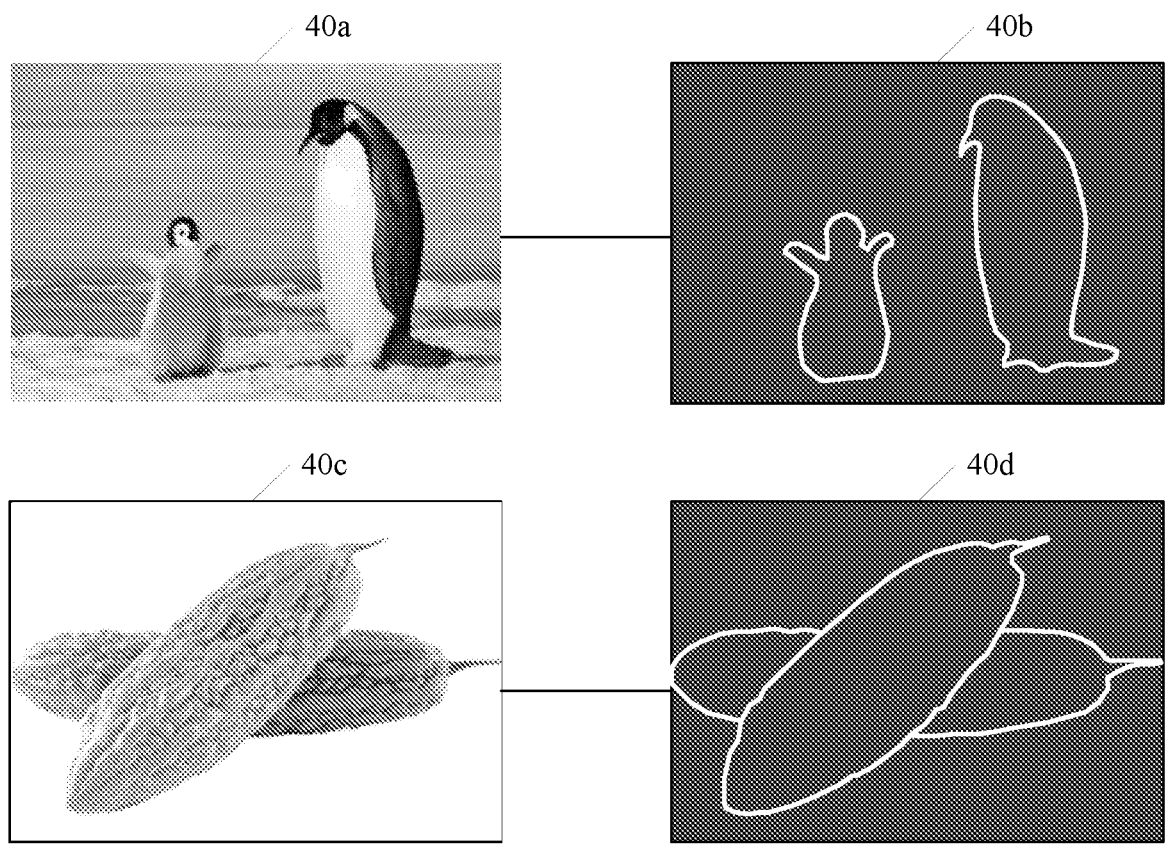
FIG. 7 is a schematic diagram of object mask images of a sample image according to an embodiment of this disclosure.

Further refer to FIG. 7, FIG. 7 being a schematic diagram of an object mask image of a sample image provided by an embodiment of this disclosure. As shown in FIG. 7, for a sample image 40a, contours of multiple mask images corresponding to the sample image 40a are extracted by using an existing algorithm, and all the contours are plotted in a same mask image, to obtain an object mask image 40b corresponding to the sample image 40a. The object mask image 40b is used for representing the real contour boundary of the sample object contained in the sample image 40a. For a sample image 40c, an object mask image 40d corresponding to the sample image 40c is obtained also by using the existing algorithm. The object mask image 40d may be used for representing the real contour boundary of the sample object contained in the sample image 40c.

Figure 8:
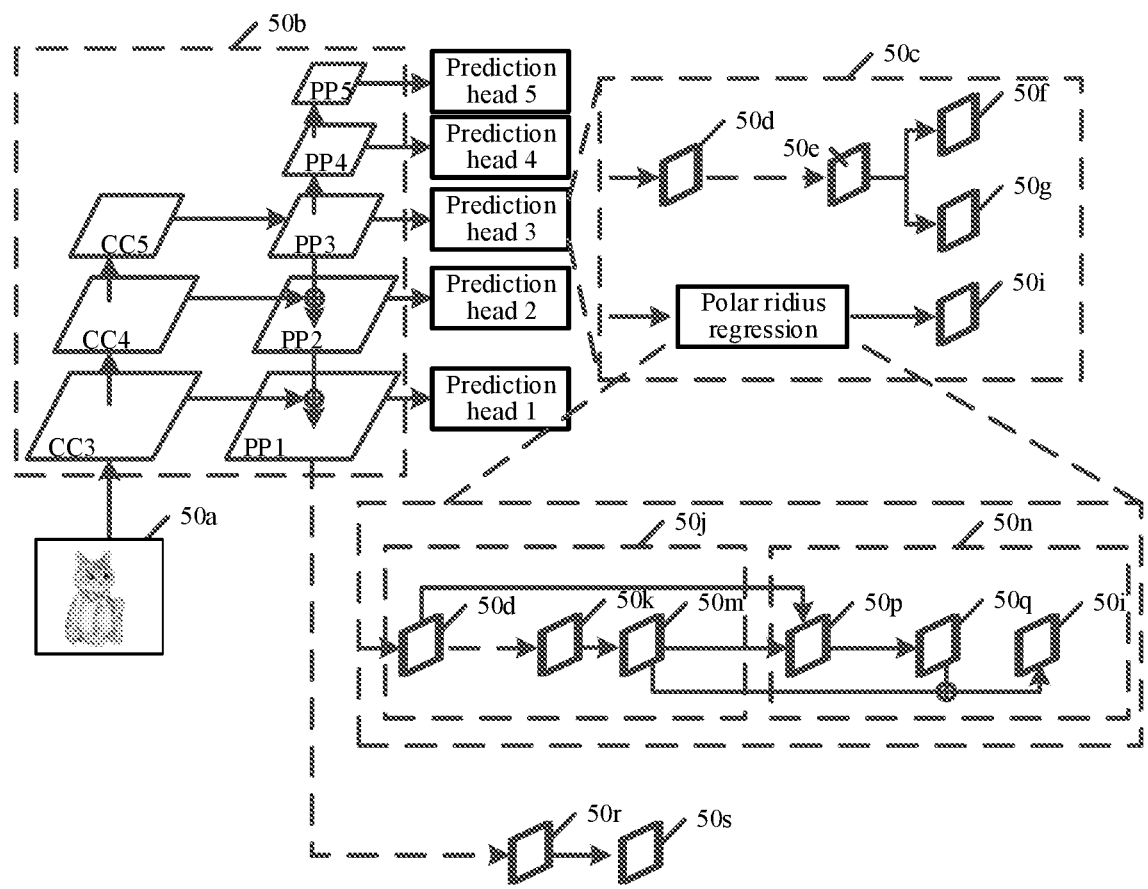
FIG. 8 is a training schematic diagram of an initial image segmentation model according to an embodiment of this disclosure.

Further refer to FIG. 8, FIG. 8 being a training schematic diagram of an initial image segmentation model provided by an embodiment of this disclosure. As shown in FIG. 8, after being acquired by the computer device, a sample image 50a is inputted into the initial image segmentation model, and a sample residual feature map CC1, a sample residual feature map CC2, a sample residual feature map CC3, a sample residual feature map CC4, and a sample residual feature map CC5 are outputted in sequence by the residual component in the initial image segmentation model, and then the sample residual feature map CC3, the sample residual feature map CC4 and the sample residual feature map CC5 are used as the input of the feature fusion component of the initial image segmentation model. Information fusion can be performed, in the feature fusion component, on the sample residual feature map CC3, the sample residual feature map CC4 and the sample residual feature map CC5 to obtain a sample feature map PP1, a sample feature map PP2, a sample feature map PP3, a sample feature map PP4 and a sample feature map PP5, where the acquisition process of the sample feature map PP1 to the sample feature map PP5 is the same as that of the object feature map P1 to the object feature map P5 above, which will not be repeated here. The residual component and feature fusion component in the initial image segmentation model may constitute the feature extractor 50b in the initial image segmentation model.

Further, the sample feature map PP1 to the sample feature map PP5 are each independently predicted, that is, any of the above five sample feature maps enters the classification component and the polar radius regression component (that is, the regression component in the initial image segmentation model) in the prediction head. For example, after being inputted into the classification component and the polar radius regression component, the sample feature map PP3 may be represented as an image feature 50d. The size of the image feature 50d may be H×W×256, that is, the height of the image feature 50d is H, the width is W, and the number of channels is 256. In the classification component of the initial image segmentation model, the image feature 50d passes through four convolutional layers (the four convolutional layers here all use the convolutional kernel with the size of 3×3) to obtain an image feature 50e (the image feature 50e may be understood as the sample classification feature map for classification, the size of which may be H×W×256). The image feature 50e enters the category prediction subcomponent and the center prediction subcomponent. Pixel category classification is performed, in the category prediction subcomponent, on the image feature 50e to obtain sample category confidence levels 50f (the size may be H×W×L) that the pixel points in the sample feature map PP3 belong to L categories respectively. The pixel center classification is performed, in the center prediction sub-component, on the image feature 50e, to obtain sample center confidence levels 50g (the size may be H×W×1) of the pixel points in the object feature map PP3 in an image region where the corresponding target object is located.

Where the polar radius regression component of the initial image segmentation model includes a coarse regression module 50j and a refine regression module 50n. In the coarse regression module 50j, the image feature 50d can pass through four convolutional layers (the four convolutional layers here all use the convolution kernel with the size of 3×3) to obtain an image feature 50k (the image feature 50k may be understood as the sample distance feature map used for polar radius regression, the size of which may be H×W×256). An initial sample polar radius 50m (the size may be H×W×36) may be predicted by the sample distance feature map, that is, the contour of the sample object in the sample image may be comprised of 36 polar radii. Further, the initial sample polar radius 50m and the image feature 50d can be both inputted into the refine regression module 50n. The sample sampling feature coordinates can be calculated based on the initial sample polar radius 50m. 36 feature vectors with the size of (1, 1, c) can be obtained by performing sampling in the sample feature map PP3 on the basis of the sample sampling feature coordinates. The 36 feature vectors are superimposed on the basis of the channel dimension to obtain a sample contour feature 50p. Each sample contour point is regressed for a sample polar radius deviation 50q by using 36 1×1 group convolutions with a group number. The sum of the sample polar radius deviation 50q and the initial sample polar radius 50m is determined as a target sample polar radius 50i.

As shown in FIG. 8, the initial image segmentation model further includes the global contour perception component. The computer device inputs the sample feature map PP1 to the global contour perception component. In the global contour perception component, the sample feature map PP1 can pass through four convolutional layers (the four convolutional layers here may all use the convolution kernel with the size of 3×3, and the numbers of channels of the four convolutional layers may be 128, 64, 64, 64 in sequence) in sequence, to obtain a feature 50r after convolution. A sample contour probability map 50s with the same size as the sample feature map PP1 can be predicted by the feature 50r.

Further, the computer device determines a sample classification result corresponding to sample pixel points in the sample image based on the sample category confidence level, and determines a classification loss function $L_{cls}$ corresponding to the classification component based on the sample classification result and the category label in the label information, where the classification loss function $L_{cls}$ may be expressed as a loss function corresponding to the category prediction subcomponent in the initial image segmentation model. A sample predicted center point corresponding to the sample object is determined in the sample image based on the sample center confidence level, and a center loss function $L_{cnt}$ corresponding to the classification component is determined based on the distance between the sample predicted center point and a labeled contour shape in the label information, where the center loss function $L_{cnt}$ is expressed as a loss function corresponding to the center prediction subcomponent in the initial image segmentation model. An initial predicted contour shape corresponding to the sample object is determined based on the initial sample polar radii, and a first regression loss function $L_{coarse}$ corresponding to the regression component is determined based on IoU between the initial predicted contour shape and the labeled contour shape, where the first regression loss function $L_{coarse}$ is expressed as a loss function corresponding to the coarse regression module in the initial image segmentation model. A target predicted contour shape corresponding to the sample object is determined based on the target sample polar radii, and a second regression loss function $L_{fine}$ corresponding to the regression component is determined based on IoU between the target predicted contour shape and the labeled contour shape, where the second regression loss function $L_{fine}$ is expressed as a loss function corresponding to the refine regression module in the initial image segmentation model. Object mask images corresponding to the sample image are acquired, and a global contour loss function $L_{hbb}$ corresponding to the initial image segmentation model is determined based on the sample contour probability map and the object mask images, where the global contour loss function $L_{hbb}$ may be expressed as a loss function corresponding to the global contour perception component in the initial image segmentation model. Then a model loss function $L_{all}$ corresponding to the initial image segmentation model is determined based on the classification loss function $L_{cls}$, the center loss function $L_{cnt}$, the first regression loss function $L_{coarse}$, the second regression loss function $L_{fine}$ and the global contour loss function $L_{hbb}$, and the network parameters of the initial image segmentation model can be corrected based on the model loss function $L_{all}$, and the parameter-corrected initial image segmentation model is determined as the target image segmentation model. Where the model loss function all may be expressed as: $L_{all}=L_{cls}+L_{cnt}+\alpha L_{coarse}+L_{fine}+L_{hbb}$. The classification loss function $L_{cls}$ and the global contour loss function $L_{hbb}$ may be a Focal loss (a loss function). The center loss function $L_{cnt}$ may be binary cross entropy. The first regression loss function $L_{coarse}$ corresponding to the coarse regression module and the second regression loss function $L_{fine}$ corresponding to the refine regression module may use polar IOU. $\alpha$ may be expressed as a hyper-parameter. The initial image segmentation model can be trained under the supervision of the model loss function $L_{all}$, and model parameters are updated continuously through a random gradient descent, and then the trained initial image segmentation model can be determined as the target image segmentation model.

In an exemplary implementation, in order to verify the segmentation effect of the trained target image segmentation model, the target image segmentation model can be verified on a data set COCO (a data set applied to an image instance segmentation scene), and the classification effect of the target image segmentation model is represented by using average precision (AP), $AP_{50}$ (an IoU threshold predicted between the candidate edge shape and the labeled contour shape may be 0.5, and the IoU threshold here is equal to the overlap threshold mentioned above), $AP_{75}$ (an IoU threshold predicted between the candidate edge shape and the labeled contour shape may be 0.75), APs (the average precision of small sample objects, where the region area of small sample objects is less than 32×32), $AP_M$ (the average precision of medium sample objects, where the region area of the medium sample objects is greater than 32×32 and less than 96×96) and APL (the average precision of large sample objects, where the region area of the large sample objects is greater than 96×96) as evaluation indexes. During an experiment, an existing model PolarMask (an image instance segmentation method) can be compared with the method proposed in this disclosure, to reflect the effectiveness of the target image segmentation model. The experimental results of the target image segmentation model and the existing model PolarMask may be shown in Table 1 below:

TABLE 1

| Method | AP | $AP_{50}$ | $AP_{75}$ | $AP_S$ | $AP_M$ | $AP_L$ |
|---|---|---|---|---|---|---|
| PolarMask | 30.4 | 51.1 | 31.2 | 13.5 | 33.5 | 43.9 |
| Target image segmentation model 1 | 31.2 | 51.6 | 32.1 | 13.9 | 33.9 | 45.7 |
| Target image segmentation model 2 | 31.7 | 52.4 | 33.0 | 14.0 | 34.8 | 46.5 |

Where the target image segmentation model 1 in table 1 above may refer to a model that is trained by the feature extractor (including the residual component and the feature fusion component), the classification component and the coarse-to-fine regression component (including the coarse regression module and the refine regression module), and the target image segmentation model 2 may refer to a model that is trained by the feature extractor (including the residual component and the feature fusion component), the classification component, the coarse-to-fine regression component (including the coarse regression module and the refine regression module) and the global contour perception component. It can be seen from Table 1 above that compared with the existing model PolarMask, the target image segmentation model 1 is increased by 0.8 in AP and 1.8 in APL, which shows that the long-distance regression problem can be well solved by the coarse-to-fine regression strategy, and thus, the precision of polar radius regression can be increased. Compared with the target image segmentation model 1, the target image segmentation model 2 is increased by 0.5 in AP, which shows that the global contour perception component has a good auxiliary effect on the polar radius regression, and thus, the precision of the polar radius regression can be further improved, and then the accuracy of image segmentation can be improved.

Figure 9:
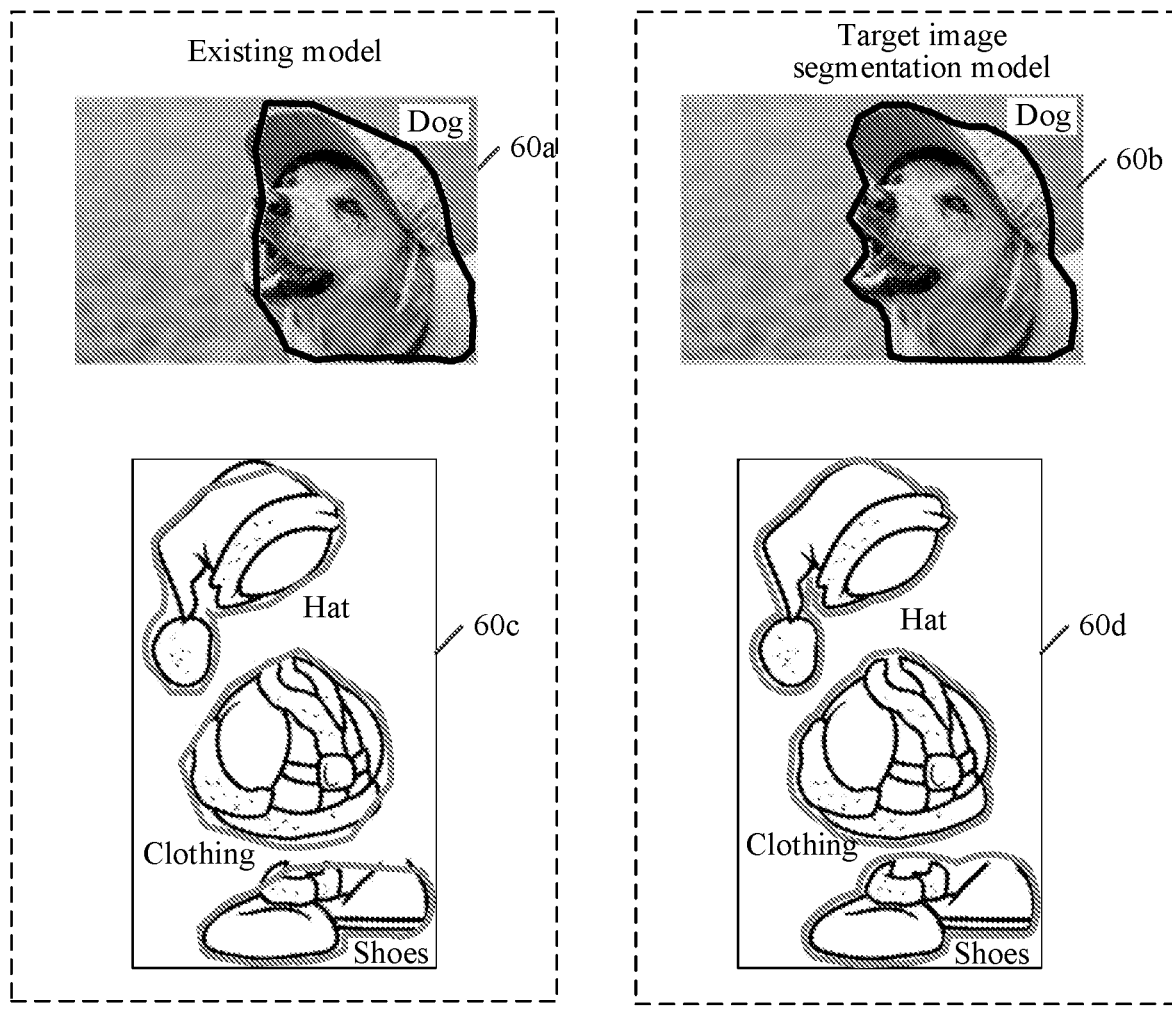
FIG. 9 is a visualized schematic diagram of segmentation results of a target image segmentation model according to an embodiment of this disclosure.

Further refer to FIG. 9, FIG. 9 being a visualized schematic diagram of segmentation results of a target image segmentation model provided by an embodiment of this disclosure. An image 60a and an image 60c, as shown in FIG. 9, are both visual representations of the object edge shape predicted by the existing model PolarMask and classification results, while an image 60b and an image 60d are both visual representations of the object edge shape predicted by the target image segmentation model (for example, the target image segmentation model 2) and classification results. As shown in FIG. 9, the object edge shape predicted by the target image segmentation model obviously more fits with an actual object contour boundary than the object edge shape predicted by the existing model PolarMask. When the image includes a plurality of target objects, the object edge shape corresponding to each target object can be predicted by the target image segmentation model, and the classification result corresponding to each target object can be recognized. The segmentation accuracy of the target object can be improved based on the target image segmentation model.

In this embodiment of this disclosure, the coarse-to-fine polar radius regression component can be introduced into the initial image segmentation model, and the initial sample polar radii are refined to acquire the target sample polar radii corresponding to the pixel points in each object feature map, and thus, the regression accuracy of the polar radii can be improved. The global contour perception component can also be introduced into the initial image segmentation model to acquire the global information of the sample object contained in the image, where the global information can be used for assisting the polar radius regression, and thus, the accuracy of image segmentation is further improved.

Figure 10:
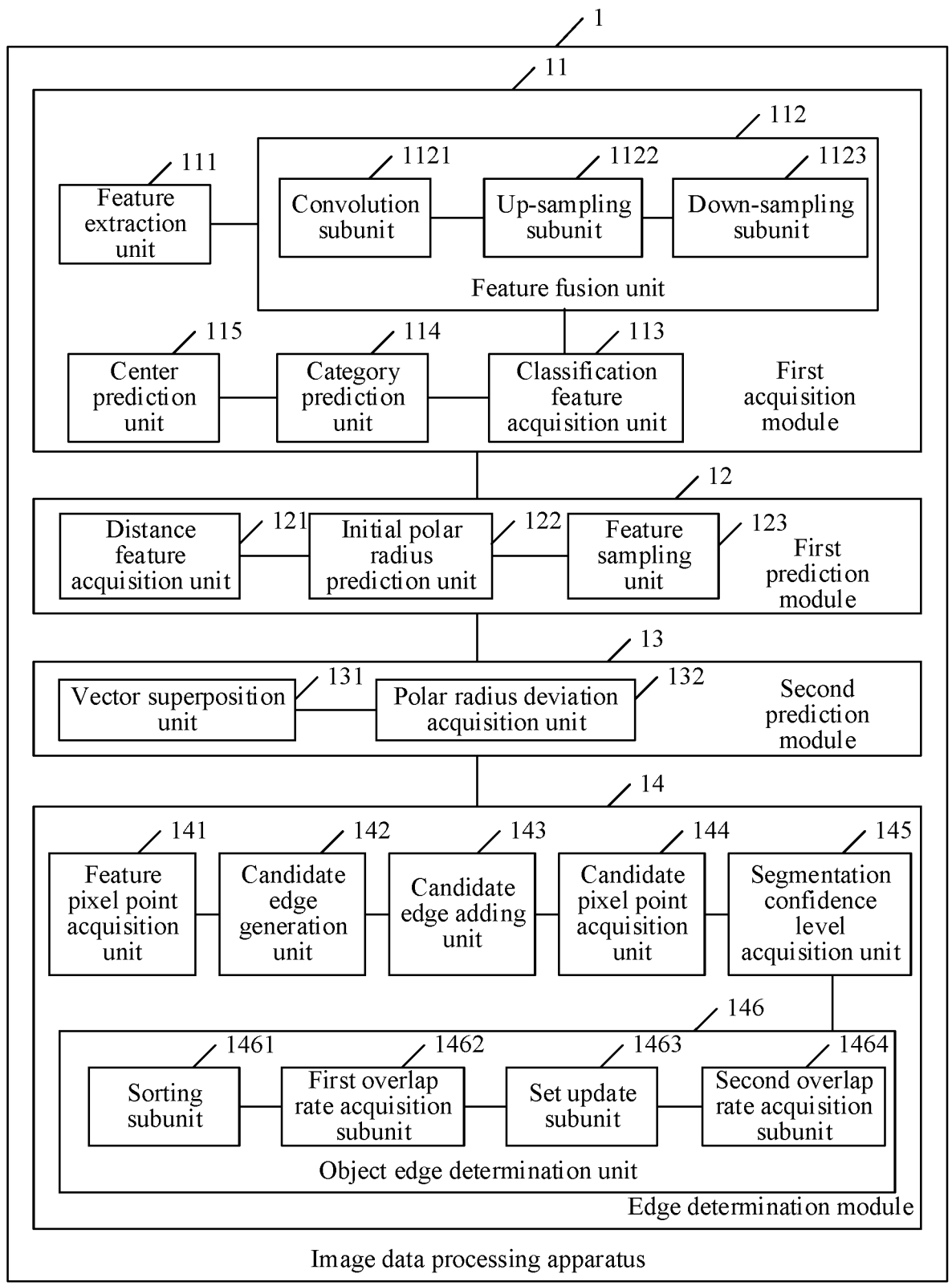
FIG. 10 is a structural schematic diagram of an image data processing apparatus according to an embodiment of this disclosure.

Refer to FIG. 10, FIG. 10 being a structural schematic diagram of an image data processing apparatus provided by an embodiment of this disclosure. It is to be understood that the image data processing apparatus may be a computer program (including a program code) applied to the computer device, for example, the image data processing apparatus may be image application software. The image data processing apparatus can be configured to perform corresponding steps in the method provided by the embodiment of this disclosure. As shown in FIG. 10, the image data processing apparatus 1 may include: a first acquisition module 11, a first prediction module 12, a second prediction module 13 and an edge determination module 14.

The first acquisition module 11 is configured to acquire the M object feature maps of the source image, the M object feature maps being associated with the target objects contained in the source image, the M object feature maps being the image features with different sizes, and M being a positive integer.

The first prediction module 12 is configured to acquire the initial predicted polar radii corresponding to the pixel points in each object feature map in the source image, and acquire, from each object feature map, the contour sampling points corresponding to the target object based on the initial predicted polar radii.

The second prediction module 13 is configured to acquire the polar radius deviations corresponding to the contour sampling points in each object feature map; determine the target predicted polar radii corresponding to the pixel points in each object feature map in the source image, the target predicted polar radius being the sum of the polar radius deviation and the initial predicted polar radius.

The edge determination module 14 is configured to determine, from the source image, the candidate edge shape associated with each object feature map based on the target predicted polar radii corresponding to the pixel points in each object feature map; determine, from the candidate edge shape associated with each object feature map, the object edge shape used for representing the contour of the target object based on the classification confidence levels corresponding to the pixel points in each object feature map, the classification confidence levels being used for representing the degree of association between the pixel points in each object feature map and the target object.

Where for specific functional implementations of the first acquisition module 11, the first prediction module 12, the second prediction module 13, and the edge determination module 14, refer to steps S101 to S104 in the corresponding embodiment in FIG. 3 above, which will not be repeated here.

In some feasible implementations, the first acquisition module 11 may include: a feature extraction unit 111 and a feature fusion unit 112.

The feature extraction unit 111 is configured to input the source image containing the target objects into the target image segmentation model, and acquire, from the source image, the N residual feature maps associated with the target objects on the basis of the residual component in the target image segmentation model, the N residual feature maps being features outputted from different network layers in the residual component, N being a positive integer.

The feature fusion unit 112 is configured to fuse, in the feature fusion component of the target image segmentation model, the N residual feature maps to obtain the M object feature maps corresponding to the target object.

In an exemplary implementation, the N residual feature maps include a first residual feature map and a second residual feature map. The size of the second residual feature map is smaller than that of the first residual feature map.

The feature fusion unit 112 may include: a convolution subunit 1121, an up-sampling subunit 1122 and a down-sampling subunit 1123.

The convolution subunit 1121 is configured to convolve, in the feature fusion component of the target image segmentation model, the first residual feature map and the second residual feature map to obtain the first convolved feature map corresponding to the first residual feature map and the second convolved feature map corresponding to the second residual feature map.

The up-sampling subunit 1122 is configured to up-sample the second convolved feature map to obtain the up-sampled feature map, and determine the fused feature map, the fused feature map being the combination of the first convolved feature map and the up-sampled feature map.

The down-sampling subunit 1123 is configured to down-sample the second convolved feature map to obtain a down-sampled feature map, and determine, based on the fused feature map, the second convolved feature map and the down-sampled feature map, the M object feature maps corresponding to the target object.

Where for specific functional implementations of the feature extraction unit 111 and the feature fusion unit 112, refer to step S101 in the corresponding embodiment in FIG. 3 above, which will not be repeated here.

In some feasible implementations, the classification confidence level includes a category confidence level and a center confidence level.

The first acquisition module 11 may include: a classification feature acquisition unit 113, a category prediction unit 114 and a center prediction unit 115.

The classification feature acquisition unit 113 is configured to acquire the object feature map $P_i$ of the M object feature maps, and acquire, in the classification component of the target image segmentation model, the object classification feature map corresponding to the object feature map $P_i$, i being a positive integer less than or equal to M.

The category prediction unit 114 is configured to perform pixel category classification on the object classification feature map on the basis of the category prediction subcomponent in the classification component, to obtain the category confidence levels that the pixel points in the object classification feature map $P_i$ belong to L categories respectively, the target image segmentation model being configured to recognize objects corresponding to the L categories, L being a positive integer.

The center prediction unit 115 is configured to perform the pixel center classification on the object classification feature map on the basis of the center prediction subcomponent in the classification component, to obtain the center confidence levels of the pixel points in the object classification feature map $P_i$ in the image region where the target object is located.

For specific functional implementations of the classification feature acquisition unit 113, the category prediction unit 114, and the center prediction unit 115, refer to step S101 in the corresponding embodiment in FIG. 3 above, which will not be repeated here.

In some feasible implementations, the first prediction module 12 may include: a distance feature acquisition unit 121, an initial polar radius prediction unit 122 and a feature sampling unit 123.

The distance feature acquisition unit 121 is configured to convolve, in the regression component of the target image segmentation model, the object feature map Pi to obtain a distance prediction feature map corresponding to the object feature map Pi, i being a positive integer less than or equal to M.

The initial polar radius prediction unit 122 is configured to determine the pixel points in the distance prediction feature map as the candidate centers, and acquire, based on the distance prediction feature map, the initial predicted polar radii corresponding to the candidate centers.

The feature sampling unit 123 is configured to determine the sampling feature coordinates based on the initial predicted polar radii and the pixel points in the object feature map $P_i$, and acquire, from the object feature map $P_i$, contour sampling points matching the sampling feature coordinates.

Where for specific functional implementations of the distance feature acquisition unit 121, the initial polar radius prediction unit 122 and the feature sampling unit 123, refer to step S102 in the corresponding embodiment in FIG. 3 above, which will not be repeated here.

In some feasible implementations, the number of the contour sampling points contained in the object feature map $P_i$ is K, K being a positive integer.

The second prediction module 13 may include: a vector superposition unit 131 and a polar radius deviation acquisition unit 132.

The vector superposition unit 131 is configured to acquire sampling feature vectors corresponding to the K contour sampling points in the object feature map Pi, and superimpose the K sampling feature vectors to obtain contour feature vectors corresponding to the target object.

The polar radius deviation acquisition unit 132 is configured to convolve the contour feature vector according to K group convolutions to obtain polar radius deviations corresponding to the K contour sampling points.

Where for specific functional implementations of the vector superposition unit 131 and the polar radius deviation acquisition unit 132, refer to step S103 in the corresponding embodiment to FIG. 3 above, which will not be repeated here.

In some feasible implementations, the edge determination module 14 may include: a feature pixel point acquisition unit 141, a candidate edge generation unit 142 and a candidate edge adding unit 143.

The feature pixel point acquisition unit 141 is configured to acquire the object feature map $P_i$ of the M object feature maps, and acquire, from the object feature map $P_i$, the pixel points $S_j$, i is a positive integer less than or equal to M, and j is a positive integer less than or equal to the number of the pixels contained in the object feature map $P_i$.

The candidate edge generation unit 142 is configured to connect, in the source image, the endpoints of the target prediction polar radii corresponding to the pixel points $S_j$ to generate the candidate edge shapes$_j$ centered on the pixel point $S_j$.

The candidate edge adding unit 143 is configured to add the candidate edge shapes associated with the pixel points in each object feature map to the candidate edge shape set corresponding to the target object.

In an exemplary implementation, the classification confidence level includes a category confidence level and a center confidence level.

The edge determination module 14 may include: a candidate pixel point acquisition unit 144, a segmentation confidence level acquisition unit 145 and an object edge determination unit 146.

The candidate pixel point acquisition unit 144 is configured to acquire, from the source image, the candidate pixel points covered by the candidate edge shape Bj.

The segmentation confidence level acquisition unit 145 is configured to determine the segmentation confidence level corresponding to the candidate edge shape Bj based on a product between the category confidence level corresponding to the candidate pixel point and the center confidence level corresponding to the candidate pixel point.

The object edge determination unit 146 is configured to determine, based on the segmentation confidence level corresponding to each candidate edge shape, the object edge shape used for representing the contour of the target object.

The apparatus further includes: an object classification result determination module, configured to acquire target pixel points covered by the object edge shape in the source image, and determine, based on the category confidence level of the target pixel point, an object classification result corresponding to the target object.

Where for specific functional implementations of the feature pixel point acquisition unit 141, the candidate edge generation unit 142, the candidate edge adding unit 143, the candidate pixel point acquisition unit 144, the segmentation confidence level acquisition unit 145, the object edge determination unit 146 and the classification result determination unit 147, refer to step S104 in the corresponding embodiment in FIG. 3 above, which will not be repeated here.

In some feasible implementations, the object edge determination unit 146 may include: a sorting subunit 1461, a first overlap degree acquisition subunit 1462, a set update subunit 1463 and a second overlap degree acquisition subunit 1464.

The sorting subunit 1461 is configured to sort each candidate edge shape by the segmentation confidence level corresponding to each candidate edge shape, and determine the candidate edge shape corresponding to the maximum segmentation confidence level as the first target edge shape.

The first overlap degree acquisition subunit 1462 is configured to determine the candidate edge shapes other than the first target edge shape as the first remaining edge shapes, and acquire the first overlap degree between the first target edge shape and the first remaining edge shape.

The set update subunit 1463 is configured to filter out the first remaining edge shape and the first target edge shape with the first overlap degree therebetween greater than the overlap threshold, and determine the first remaining edge shape corresponding to the maximum segmentation confidence level in the remaining candidate edge shapes as a second target edge shape.

The second overlap degree acquisition subunit 1464 is configured to determine the first remaining edge shapes other than the second target edge shape as the second remaining edge shapes, and determine the first target edge shape and the second target edge shape as the object edge shapes corresponding to the target object, when the second overlap degree between the second target edge shape and the second remaining edge shape is greater than the overlap threshold.

Where for specific functional implementations of the sorting subunit 1461, the first overlap degree acquisition subunit 1462, the set update subunit 1463 and the second overlap degree acquisition subunit 1464, refer to step S104 in the corresponding embodiment in FIG. 3 above, which will not be repeated here.

In this embodiment of this disclosure, in the segmentation process of the source image, the M object feature maps with different sizes can be obtained by performing feature extraction on the source image. While the classification confidence levels corresponding to the pixel points in each object feature map are acquired, the initial predicted polar radii corresponding to the pixel points in each object feature map may also be acquired. The initial predicted polar radii are refined based on the polar radius deviations corresponding to the contour sampling points in each object feature map to acquire the target predicted polar radii corresponding to the pixel points in each object feature map, which can improve the regression accuracy of the target predicted polar radius. Then the object edge shape of the target object contained in the source image can be determined based on the target predicted polar radii and the classification confidence level, thereby improving the accuracy of image segmentation.

Figure 11:
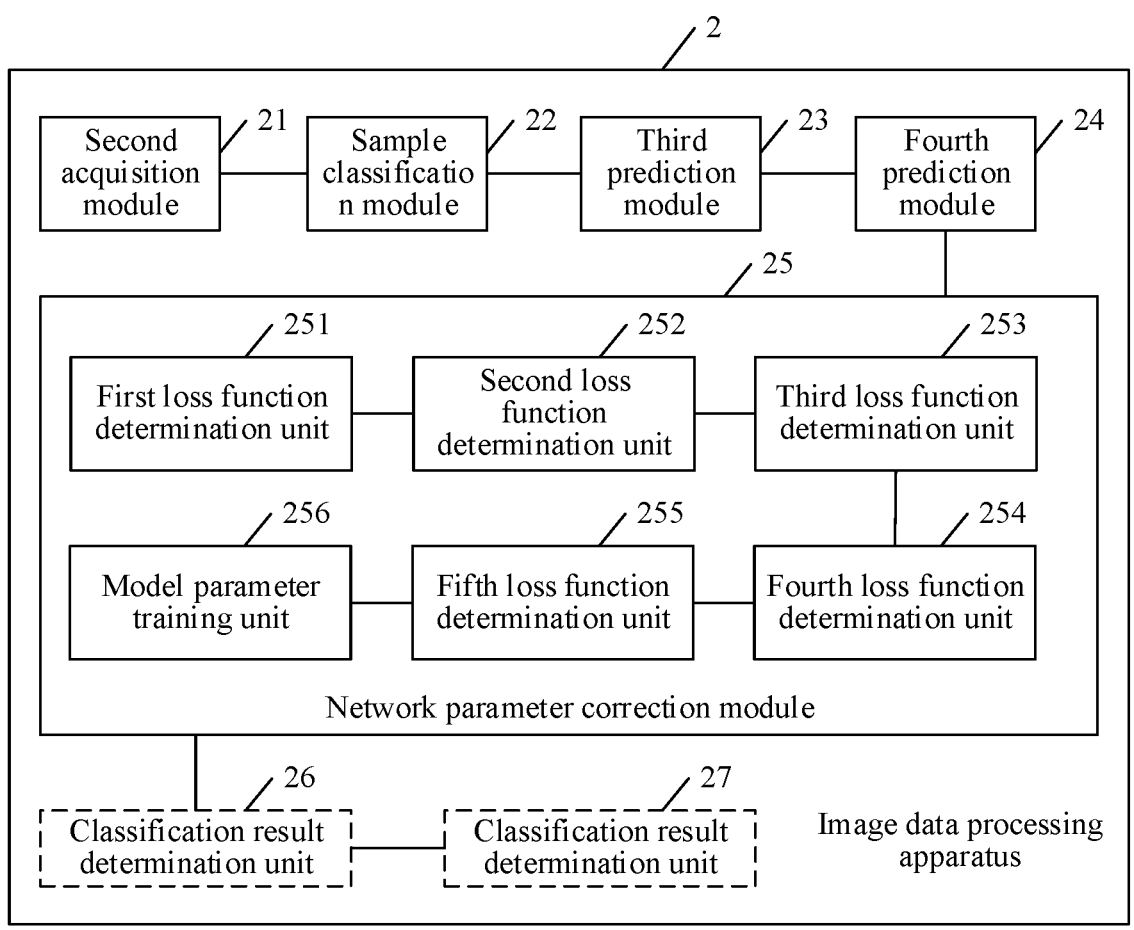
FIG. 11 is a structural schematic diagram of an image data processing apparatus according to an embodiment of this disclosure.

Refer to FIG. 11, FIG. 11 being a structural schematic diagram of an image data processing apparatus provided by an embodiment of this disclosure. It is to be understood that the image data processing apparatus may be a computer program (including a program code) applied to the computer device, for example, the image data processing apparatus may be image application software. The image data processing apparatus can be configured to perform corresponding steps in the method provided by the embodiment of this disclosure. As shown in FIG. 11, the image data processing apparatus 2 may include: a second acquisition module 21, a sample classification module 22, a third prediction module 23, a fourth prediction module 24 and a network parameter correction module 25.

The second acquisition module 21 is configured to acquire a sample image containing sample objects, input the sample image into the initial image segmentation model, and output the M sample feature maps associated with the sample object by a residual component and a feature fusion component in the initial image segmentation model, the sample image carrying the label information corresponding to the sample object, the M sample feature images being the image features with different sizes, and M being a positive integer.

The sample classification module 22 is configured to output sample classification confidence levels corresponding to pixel points in each sample feature map by a classification component in the initial image segmentation model, the sample classification confidence levels being used for representing the degree of association between the pixel points in each object feature map and the sample object.

The third prediction module 23 is configured to acquire, in a regression component of the initial image segmentation model, initial sample polar radii corresponding to the pixel points in each sample feature map, and acquire, from each sample feature map, sample contour sampling points corresponding to the sample object based on the initial sample polar radii, the contour comprised of the sample contour sampling points being associated with the contour of the sample object.

The fourth prediction module 24 is configured to acquire sample polar radius deviations corresponding to the sample contour sampling points in each sample feature map, and determine the sum of the sample polar radius deviation and the initial sample polar radius as a target sample polar radius corresponding to the pixel point in each sample feature map.

The network parameter correction module 25 is configured to train, based on the sample classification confidence levels, the initial sample polar radii, the target sample polar radii and the label information, the network parameters of the initial image segmentation model to obtain the target image segmentation model, the target image segmentation model being configured to locate and recognize the target object in the source image.

Where for specific functional implementations of the second acquisition module 21, the sample classification module 22, the third prediction module 23, the fourth prediction module 24, and the network parameter correction module 25, refer to steps S201 to S205 in the corresponding embodiment in FIG. 6 above, which will not be repeated here.

In some feasible implementations, the initial image segmentation model further includes a global contour perception component.

The image data processing apparatus 2 may further include: a feature input module 26 and a sample contour acquisition module 27.

The feature input module 26 is configured to determine the sample feature map with the largest size in the M sample feature maps as an input feature map, and input the input feature map to the global contour perception component.

The sample contour acquisition module 27 is configured to convolve, in the global contour perception component, the input feature map, to acquire a sample contour probability map associated with the sample object.

Where for specific functional implementation of the feature input module 26 and the sample contour acquisition module 27, refer to step S205 in the corresponding embodiment in FIG. 6 above, which will not be repeated here.

In some feasible implementations, the sample classification confidence level includes a sample category confidence level and a sample center confidence level.

The network parameter correction module 25 may include: a first loss function determination unit 251, a second loss function determination unit 252, a third loss function determination unit 253, a fourth loss function determination unit 254, a fifth loss function determination unit 255 and a model parameter training unit 256.

The first loss function determination unit 251 is configured to determine, based on the sample category confidence levels, the sample classification result corresponding to the sample pixel points in the sample image, and to determine, based on the sample classification result and the category label in the label information, the classification loss function corresponding to the classification component.

The second loss function determination unit 252 is configured to determine, from the sample center confidence levels, the sample predicted center point corresponding to the sample object based on the sample image, and determine, based on the distance between the sample predicted center point and the labeled contour shape in the label information, the center loss function corresponding to the classification component.

The third loss function determination unit 253 is configured to determine, based on the initial sample polar radii, the initial predicted contour shape corresponding to the sample object, and determine, based on the IoU between the initial predicted contour shape and the labeled contour shape, the first regression loss function corresponding to the regression component.

The fourth loss function determination unit 254 is configured to determine, based on the target sample polar radii, the target predicted contour shape corresponding to the sample object, and determine, based on the IoU between the target predicted contour shape and the labeled contour shape, the second regression loss function corresponding to the regression component.

The fifth loss function determination unit 255 is configured to acquire the object mask images corresponding to the sample image, and determine, based on the sample contour probability map and the object mask images, the global contour loss function corresponding to the initial image segmentation model.

The model parameter training unit 256 is configured to train, based on the classification loss function, the center loss function, the first regression loss function, the second regression loss function and the global contour loss function, the network parameters of the initial image segmentation model to obtain the target image segmentation model.

Where for specific functional implementations of the first loss function determination unit 251, the second loss function determination unit 252, the third loss function determination unit 253, the fourth loss function determination unit 254, the fifth loss function determination unit 255 and the model parameter training unit 256, refer to step S205 in the corresponding embodiment in FIG. 6 above, which will not be repeated here.

In this embodiment of this disclosure, the coarse-to-fine polar radius regression component can be introduced into the initial image segmentation model, and the initial sample polar radii are refined to acquire the target sample polar radii corresponding to the pixel points in each object feature map, and thus, the regression accuracy of the polar radii can be improved. The global contour perception component can also be introduced into the initial image segmentation model to acquire the global information of the sample object contained in the image, where the global information can be used for assisting the polar radius regression, and thus, the accuracy of image segmentation is further improved.

Figure 12:
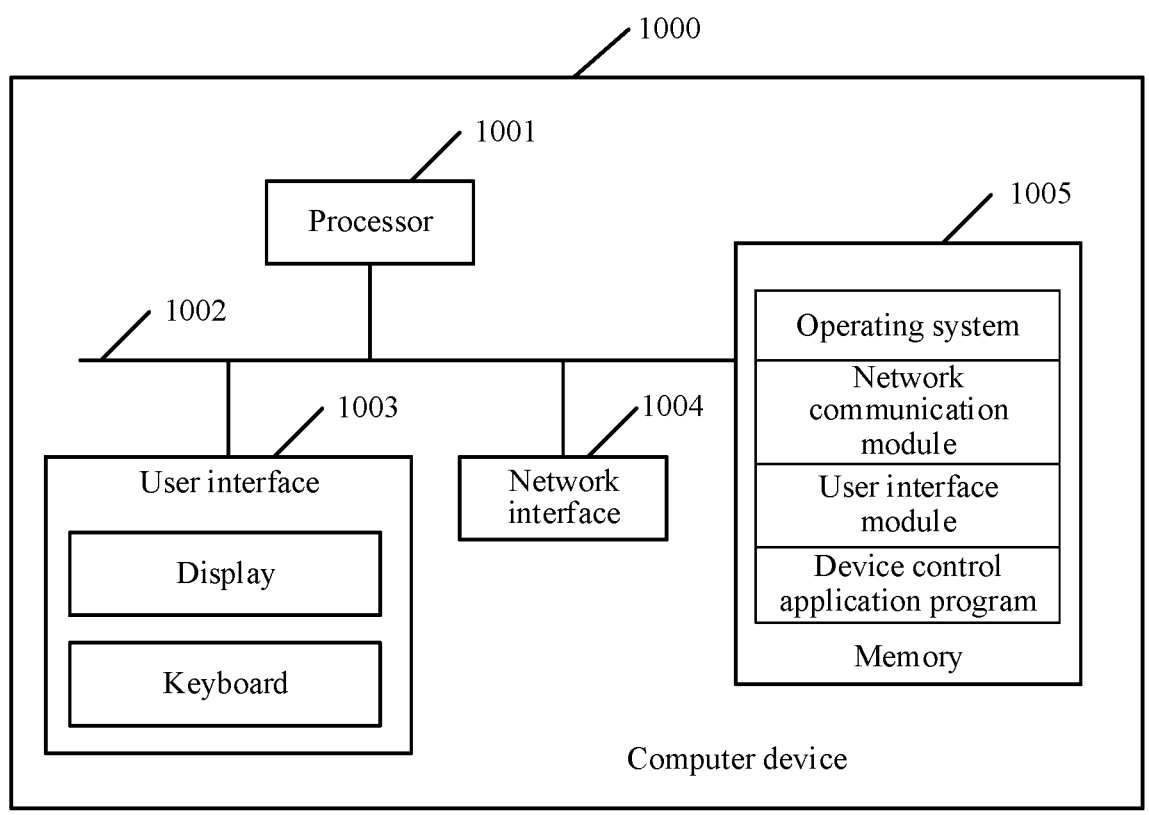
FIG. 12 is a structural schematic diagram of a computer device according to an embodiment of this disclosure.

Refer to FIG. 12, FIG. 12 being a structural schematic diagram of a computer device provided by an embodiment of this disclosure. As shown in FIG. 12, the computer device 1000 may include: a processor 1001, a network interface 1004 and a memory 1005. Furthermore, the above computer device 1000 may further include: a user interface 1003, and at least one communication bus 1002. Where the communications bus 1002 is configured to implement connections and communications between these components. Where the user interface 1003 may include a display and a keyboard. In an exemplary implementation, the user interface 1003 may further include a standard wired interface and wireless interface. In an exemplary implementation, the network interface 1004 may include a standard wired interface and a standard wireless interface (such as a Wi-Fi interface). The memory 1005 may be a high-speed RAM memory, or may be a non-transitory memory, for example, at least one magnetic disk memory. In an exemplary implementation, the memory 1005 may also be at least one storage apparatus located away from the aforementioned processor 1001. As shown in FIG. 12, the memory 1005 used as a computer storage medium may include an operating system, a network communications module, a user interface module, and a device-control application program.

In the computer device 1000 as shown in FIG. 12, the network interface 1004 can provide a network communication function. The user interface 1003 is an interface mainly configured to provide input for a user. The processor 1001 may be configured to invoke a device control application stored in the memory 1005 to implement:

Acquire the M object feature maps associated with the target object contained in the source image, and acquire, based on the M object feature maps, the classification confidence levels corresponding to the pixel points in each object feature map, the M object feature maps being the image features with different sizes, the classification confidence levels being used for representing the degree of association between the pixel points in each object feature map and the target object, and M being a positive integer;

Acquire, based on the M object feature maps, the initial predicted polar radii corresponding to the pixel points in each object feature map, and acquire, from each object feature map, the contour sampling points corresponding to the target object based on the initial predicted polar radii, the contour comprised of the sample contour sampling points being associated with the contour of the sample object;

Acquire the polar radius deviations corresponding to the contour sampling points in each object feature map, and determine the sum of the polar radius deviation and the initial predicted polar radius as the target predicted polar radius corresponding to the pixel point in each object feature map; and Determine, from the source image, the candidate edge shape associated with each object feature map based on the target predicted polar radii corresponding to the pixel points in each object feature map, add the candidate edge shape associated with each object feature map to the candidate edge shape set, and determine, from the candidate edge shape set, the object edge shape used for representing the contour of the target object based on the classification confidence levels corresponding to the pixel points in each object feature map.

Alternatively, the processor 1001 may be configured to implement: acquire the M object feature maps of the source image, the M object feature maps being associated with the target objects contained in the source image, the M object feature maps being the image features with different sizes, and M being a positive integer; acquire the initial predicted polar radii corresponding to the pixel points in each object feature map in the source image, and acquire, from each object feature map, the contour sampling points corresponding to the target object based on the initial predicted polar radii; acquire the polar radius deviations corresponding to the contour sampling points in each object feature map; determine the target predicted polar radii corresponding to the pixel points in each object feature map in the source image, the target predicted polar radius being the sum of the polar radius deviation and the initial predicted polar radius; determine, from the source image, the candidate edge shape associated with each object feature map based on the target predicted polar radii corresponding to the pixel points in each object feature map; and determine, from the candidate edge shape associated with each object feature map, the object edge shape used for representing the contour of the target object based on the classification confidence levels corresponding to the pixel points in each object feature map, the classification confidence levels being used for representing the degree of association between the pixel points in each object feature map and the target object.

It is to be understood that the computer device 1000 described in this embodiment of this disclosure can perform the description of the image data processing method in either of the corresponding embodiments in FIGS. 3 and 6 above, or can perform the description of the image data processing apparatus 1 in the corresponding embodiment in FIG. 10 above and the image data processing apparatus 2 in the corresponding embodiment in FIG. 11, which will not be repeated here. In addition, the description of beneficial effects of the same method is not described herein again.

Furthermore, it is to be pointed out here: the embodiments of this disclosure further provide a computer-readable storage medium, in which the computer program executed by the image data processing apparatus 1 and the image data processing apparatus 2 mentioned above is stored, and the computer program includes a program instruction. The program instruction, when executed by the processor, can execute the description of the image data processing method in any corresponding embodiment of FIGS. 3 an 6 above, which therefore will not be repeated here. In addition, the description of beneficial effects of the same method is not described herein again. For technical details that are not disclosed in the computer storage medium embodiments of this disclosure, refer to the descriptions of the method embodiments of this disclosure. As an example, the program instruction may be deployed on a computing device for being executed, or executed on multiple computing devices located in one location, or executed on a plurality of computing devices distributed in multiple locations and interconnected by a communication network. The plurality of computing devices distributed in the plurality of locations and interconnected by the communication network may constitute a blockchain system.

Furthermore, the embodiments of this disclosure further provide a computer program product or computer program, where the computer program product or computer program may include a computer instruction, and the computer instruction is stored in a computer-readable storage medium. The processor of the computer device reads the computer instruction from the computer-readable storage medium, and the processor executes the computer instruction, such that the computer device can execute the description of the image data processing method in any corresponding embodiment in FIGS. 3 and 6 above, which therefore will not be repeated here. In addition, the description of beneficial effects of the same method is not described herein again. For technical details that are not disclosed in the computer program product or computer program embodiments involved in this disclosure, refer to the descriptions of the method embodiments of this disclosure.

To simplify the description, the foregoing method embodiments are described as a series of action combination. But a person skilled in the art is to know that this disclosure is not limited to any described sequence of the action, as some steps can adopt other sequences or can be executed simultaneously according to this disclosure. In addition, a person skilled in the art is also to know that the related actions and modules in the embodiments described in the specification are not necessarily mandatory to this disclosure.

The steps in the method of the embodiments of this disclosure can be adjusted in order, combined and deleted according to the actual needs.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry.

Those of ordinary skill in the art are to understand that all or a part of the processes of the method in the foregoing embodiment may be implemented by a computer program instructing relevant hardware. The computer program may be stored in a computer readable storage medium. When the program is run, the processes of the method in the foregoing embodiment are performed. Where the storage medium may be a magnetic disc, an optical disc, a read-only memory (ROM), a random access memory (RAM) or the like.

What is disclosed above is merely some examples of this disclosure, and certainly is not intended to limit the claims of this disclosure. Therefore, equivalent variations made in accordance with the claims of this disclosure shall still fall within the scope of this disclosure.

What is claimed is:

1. An image data processing method, executed by a computer device, and comprising:
   acquiring M object feature maps of a source image, the M object feature maps being associated with target objects contained in the source image, the M object feature maps being image features with different sizes, and M being a positive integer;
   acquiring initial predicted polar radii corresponding to pixel points in each of the object feature maps in the source image, and acquiring, from each of the object feature maps, contour sampling points corresponding to the target object based on the initial predicted polar radii;
   acquiring polar radius deviations corresponding to the contour sampling points in each of the object feature maps;
   determining target predicted polar radii corresponding to the pixel points in each of the object feature maps in the source image, the target predicted polar radius being a sum of the polar radius deviation and the initial predicted polar radius;
   determining, from the source image, a candidate edge shape associated with each of the object feature maps based on the target predicted polar radii corresponding to the pixel points in each of the object feature maps; and
   determining, from the candidate edge shape associated with each of the object feature maps, an object edge shape representing a contour of the target object based on the classification confidence levels corresponding to the pixel points in each of the object feature maps, the classification confidence levels representing a degree of association between the pixel points in each of the object feature maps and the target object.

2. The method according to claim 1, wherein the acquiring the M object feature maps of the source image comprises:

inputting the source image containing the target object into a target image segmentation model, and acquiring, from the source image, N residual feature maps associated with the target object using a residual component in the target image segmentation model, the N residual feature maps being features outputted from different network layers in the residual component, N being a positive integer;

fusing, in a feature fusion component of the target image segmentation model, the N residual feature maps to obtain the M object feature maps corresponding to the target object.

3. The method according to claim 2, wherein the N residual feature maps comprise a first residual feature map and a second residual feature map, a size of the second residual feature map being smaller than that of the first residual feature map, and the fusing the N residual feature maps to obtain the M object feature maps corresponding to the target object comprises:

convolving, in the feature fusion component of the target image segmentation model, the first residual feature map and the second residual feature map to obtain a first convolved feature map corresponding to the first residual feature map and a second convolved feature map corresponding to the second residual feature map;

up-sampling the second convolved feature map to obtain an up-sampled feature map, and determining a fused feature map, the fused feature map being a combination of the first convolved feature map and the up-sampled feature map; and down-sampling the second convolved feature map to obtain a down-sampled feature map, and determining, based on the fused feature map, the second convolved feature map and the down-sampled feature map, the M object feature maps corresponding to the target object.

4. The method according to claim 1, wherein the classification confidence level comprises a category confidence level and a center confidence level, and the method further comprises:

acquiring, in a classification component of the target image segmentation model, an object classification feature map corresponding to an object feature map Pi, i being a positive integer less than or equal to M;

performing pixel category classification on the object classification feature map using a category prediction subcomponent in the classification component, to obtain category confidence levels that pixel points in the object classification feature map Pi belong to L categories respectively, the target image segmentation model being configured to recognize objects corresponding to the L categories, L being a positive integer;

performing pixel center classification on the object classification feature map using a center prediction subcomponent in the classification component, to obtain center confidence levels of the pixel points in the object classification feature map Pi in an image region where the target object is located.

5. The method according to claim 1, wherein the acquiring the initial predicted polar radii corresponding to the pixel points and acquiring the contour sampling points corresponding to the target object based on the initial predicted polar radii comprise:

convolving, in a regression component of the target image segmentation model, the object feature map Pi to obtain a distance prediction feature map corresponding to the object feature map Pi, i being a positive integer less than or equal to M;

determining pixel points in the distance prediction feature map as candidate centers, and acquiring, based on the distance prediction feature map, initial predicted polar radii corresponding to the candidate centers; and determining, based on the initial predicted polar radii and the pixel points in the object feature map Pi, sampling feature coordinates, and acquiring, from the object feature map Pi, contour sampling points matching the sampling feature coordinates.

6. The method according to claim 5, wherein a number of the contour sampling points contained in the object feature map Pi is K, K being a positive integer, and the acquiring the polar radius deviations corresponding to the contour sampling points comprises:

acquiring sampling feature vectors corresponding to the K contour sampling points in the object feature map Pi, and superimposing the K sampling feature vectors to obtain contour feature vectors corresponding to the target object; and convolving the contour feature vectors according to K group convolutions to obtain polar radius deviations corresponding to the K contour sampling points.

7. The method according to claim 1, wherein the determining, from the source image, the candidate edge shape based on the target predicted polar comprises:

connecting, in the source image, endpoints of target predicted polar radii corresponding to the pixel points Sj to generate candidate edge shapes Bj centered on the pixel point Sj, i being a positive integer less than or equal to the M, and j being a positive integer less than or equal to a number of pixels contained in the object feature map Pi.

8. The method according to claim 7, wherein the classification confidence level comprises a category confidence level and a center confidence level, and the determining, from the candidate edge shape, the object edge shape based on the classification confidence levels corresponding to the pixel points comprises:

acquiring, in the source image, candidate pixel points covered by the candidate edge shape Bj;

determining a segmentation confidence level corresponding to the candidate edge shape Bj based on a product of the category confidence level corresponding to the candidate pixel point and the center confidence level corresponding to the candidate pixel point; and determining, based on the segmentation confidence level corresponding to each of the candidate edge shapes, the object edge shape representing a contour of the target object; and the method further comprises:

acquiring the target pixel points covered by the object edge shape in the source image, and determining, based on the category confidence levels corresponding to the target pixel points, an object classification result corresponding to the target object.

9. The method according to claim 8, wherein the determining the object edge shape representing the contour of the target object comprises:

sorting candidate edge shapes by the segmentation confidence level corresponding to each of the candidate edge shapes, and determining a candidate edge shape with the maximum segmentation confidence level as a first target edge shape;

determining the candidate edge shapes other than the first target edge shape as first remaining edge shapes, and acquiring a first overlap degree between the first target edge shape and the first remaining edge shape;

filtering out the first target edge shape and the first remaining edge shape with the first overlap degree therebetween greater than an overlap threshold, and determining a first remaining edge shape with a maximum segmentation confidence level among the remaining candidate edge shapes as a second target edge shape; and determining the first remaining edge shapes other than the second target edge shape as second remaining edge shapes, and determining the first target edge shape and the second target edge shape as object edge shapes corresponding to the target object, in response to a second overlap degree between the second target edge shape and the second remaining edge shape being greater than the overlap threshold.

10. An image data processing method, comprising:

acquiring a sample image containing sample objects, inputting the sample image into an initial image segmentation model, and outputting M sample feature maps associated with the sample object using a residual component and a feature fusion component in the initial image segmentation model, the sample image carrying label information corresponding to the sample object, the M sample feature images being image features with different sizes, and M being a positive integer;

outputting sample classification confidence levels corresponding to pixel points in each of the sample feature maps using a classification component in the initial image segmentation model, the sample classification confidence levels representing a degree of association between the pixel points in each of the object feature maps and the sample object;

acquiring, in a regression component of the initial image segmentation model, initial sample polar radii corresponding to the pixel points in each of the object feature maps, and acquiring, from each of the object feature maps, sample contour sampling points corresponding to the sample object based on the initial sample polar radii, a contour comprised of the sample contour sampling points being associated with the contour of the sample object;

acquiring sample polar radius deviations corresponding to the sample contour sampling points in each of the object feature maps, and determining a sum of the sample polar radius deviation and the initial sample polar radius as a target sample polar radius corresponding to the pixel point in each of the object feature maps; and training, based on the sample classification confidence levels, the initial sample polar radii, the target sample polar radii and the label information, network parameters of the initial image segmentation model to obtain a target image segmentation model, the target image segmentation model being configured to locate and recognize a target object in a source image.

11. The method according to claim 10, wherein the initial image segmentation model further includes a global contour perception component, and the method further comprises:

inputting the sample feature map with a largest size among the M sample feature maps into the global contour perception component, and acquiring a sample contour probability map associated with the sample object.

12. The method according to claim 11, wherein the sample classification confidence level comprises a sample category confidence level and a sample center confidence level, and the training the initial sample polar radii, the target sample polar radii and the label information, the network parameters of the initial image segmentation model to obtain the target image segmentation model comprises:

determining, based on the sample category confidence level, a sample classification result corresponding to sample pixel points in the sample image, and determining, based on the sample classification result and a category label in the label information, a classification loss function corresponding to the classification component;

determining, from the sample image, a sample predicted center point corresponding to the sample object based on the sample center confidence level, and determining, based on a distance between the sample predicted center point and a labeled contour shape in the label information, a center loss function corresponding to the classification component;

determining, based on the initial sample polar radii, an initial predicted contour shape corresponding to the sample object, and determining, based on intersection-over-Union (IoU) between the initial predicted contour shape and the labeled contour shape, a first regression loss function corresponding to the regression component;

determining, based on the target sample polar radii, a target predicted contour shape corresponding to the sample object, and determining, based on IoU between the target predicted contour shape and the labeled contour shape, a second regression loss function corresponding to the regression component;

acquiring object mask images corresponding to the sample image, and determining, based on the sample contour probability map and the object mask images, a global contour loss function corresponding to the initial image segmentation model; and training, based on the classification loss function, the center loss function, the first regression loss function, the second regression loss function and the global contour loss function, the network parameters of the initial image segmentation model to obtain the target image segmentation model.

13. An image data processing apparatus, comprising:

a memory operable to store computer-readable instructions; and a processor circuitry operable to read the computer-readable instructions, the processor circuitry when executing the computer-readable instructions is configured to:

acquire M object feature maps of a source image, the M object feature maps being associated with target objects contained in the source image, the M object feature maps being image features with different sizes, and M being a positive integer;

acquire initial predicted polar radii corresponding to pixel points in each of the object feature maps in the source image, and acquire, from each of the object feature maps, contour sampling points corresponding to the target object based on the initial predicted polar radii;

acquire polar radius deviations corresponding to the contour sampling points in each of the object feature maps;

determine target predicted polar radii corresponding to the pixel points in each of the object feature maps in the source image, the target predicted polar radius being a sum of the polar radius deviation and the initial predicted polar radius;

determine, from the source image, a candidate edge shape associated with each of the object feature maps based on the target predicted polar radii corresponding to the pixel points in each of the object feature maps; and determine, from the candidate edge shape associated with each of the object feature maps, an object edge shape representing a contour of the target object based on the classification confidence levels corresponding to the pixel points in each of the object feature maps, the classification confidence levels representing a degree of association between the pixel points in each of the object feature maps and the target object.

14. The apparatus according to claim 13, wherein the processor circuitry is configured to:

input the source image containing the target object into a target image segmentation model, and acquire, from the source image, N residual feature maps associated with the target object using a residual component in the target image segmentation model, the N residual feature maps being features outputted from different network layers in the residual component, N being a positive integer;

fuse, in a feature fusion component of the target image segmentation model, the N residual feature maps to obtain the M object feature maps corresponding to the target object.

15. The apparatus according to claim 14, wherein the N residual feature maps comprise a first residual feature map and a second residual feature map, the size of the second residual feature map being smaller than that of the first residual feature map, and the processor circuitry is configured to:

convolve, in the feature fusion component of the target image segmentation model, the first residual feature map and the second residual feature map to obtain a first convolved feature map corresponding to the first residual feature map and a second convolved feature map corresponding to the second residual feature map;

up-sample the second convolved feature map to obtain an up-sampled feature map, and determine a fused feature map, the fused feature map being a combination of the first convolved feature map and the up-sampled feature map; and down-sample the second convolved feature map to obtain a down-sampled feature map, and determine, based on the fused feature map, the second convolved feature map and the down-sampled feature map, the M object feature maps corresponding to the target object.

16. The apparatus according to claim 13, wherein the classification confidence level comprises a category confidence level and a center confidence level, and the processor circuitry is further configured to:

acquire, in a classification component of the target image segmentation model, an object classification feature map corresponding to an object feature map Pi, i being a positive integer less than or equal to M;

perform pixel category classification on the object classification feature map using a category prediction subcomponent in the classification component, to obtain category confidence levels that pixel points in the object classification feature map Pi belong to L categories respectively, the target image segmentation model being configured to recognize objects corresponding to the L categories, L being a positive integer;

perform pixel center classification on the object classification feature map using a center prediction subcomponent in the classification component, to obtain center confidence levels of the pixel points in the object classification feature map Pi in an image region where the target object is located.

17. The apparatus according to claim 13, wherein the processor circuitry is configured to:

convolve, in a regression component of the target image segmentation model, the object feature map Pi to obtain a distance prediction feature map corresponding to the object feature map Pi, i being a positive integer less than or equal to M;

determine pixel points in the distance prediction feature map as candidate centers, and acquire, based on the distance prediction feature map, initial predicted polar radii corresponding to the candidate centers; and determine, based on the initial predicted polar radii and the pixel points in the object feature map Pi, sampling feature coordinates, and acquire, from the object feature map Pi, contour sampling points matching the sampling feature coordinates.

18. The apparatus according to claim 17, wherein the number of the contour sampling points contained in the object feature map Pi is K, K being a positive integer, and the processor circuitry is configured to:

acquire sampling feature vectors corresponding to the K contour sampling points in the object feature map Pi, and superimpose the K sampling feature vectors to obtain contour feature vectors corresponding to the target object; and convolve the contour feature vectors according to K group convolutions to obtain polar radius deviations corresponding to the K contour sampling points.

19. The apparatus according to claim 13, wherein the processor circuitry is configured to:

connect, in the source image, endpoints of target predicted polar radii corresponding to the pixel points Sj to generate candidate edge shapes Bj centered on the pixel point Sj, i being a positive integer less than or equal to the M, and j being a positive integer less than or equal to the number of pixels contained in the object feature map Pi.

20. The apparatus according to claim 19, wherein the classification confidence level comprises a category confidence level and a center confidence level, and the processor circuitry is further configured to:

acquire, in the source image, candidate pixel points covered by the candidate edge shape Bj;

determine a segmentation confidence level corresponding to the candidate edge shape Bj based on a product of the category confidence level corresponding to the candidate pixel point and the center confidence level corresponding to the candidate pixel point;

determine, based on the segmentation confidence level corresponding to each of the candidate edge shapes, the object edge shape representing a contour of the target object; and acquire the target pixel points covered by the object edge shape in the source image, and determine, based on the category confidence levels corresponding to the target pixel points, an object classification result corresponding to the target object.

* * * * *